United States Patent
Ikehashi

(10) Patent No.: US 8,503,157 B2
(45) Date of Patent: Aug. 6, 2013

(54) MEMS DEVICE

(75) Inventor: Tamio Ikehashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 269 days.

(21) Appl. No.: 12/883,685

(22) Filed: Sep. 16, 2010

(65) Prior Publication Data

US 2011/0063773 A1   Mar. 17, 2011

(30) Foreign Application Priority Data

Sep. 16, 2009   (JP) ................. 2009-214849

(51) Int. Cl.
*H01G 7/00* (2006.01)
*H01G 7/06* (2006.01)
*H01G 5/00* (2006.01)

(52) U.S. Cl.
USPC .......................... 361/281; 361/277

(58) Field of Classification Search
USPC .................. 361/277, 281, 280, 287
See application file for complete search history.

(56) References Cited

U.S. PATENT DOCUMENTS

| | | | |
|---|---|---|---|
| 6,040,611 A * | 3/2000 | De Los Santos et al. | 257/415 |
| 6,229,684 B1 * | 5/2001 | Cowen et al. | 361/278 |
| 6,362,018 B1 * | 3/2002 | Xu et al. | 438/50 |
| 6,472,962 B1 | 10/2002 | Guo et al. | |
| 6,853,534 B2 * | 2/2005 | Williams | 361/277 |
| 7,499,257 B2 * | 3/2009 | Lempkowski et al. | 361/287 |
| 7,795,778 B2 * | 9/2010 | Ikehashi | 310/309 |
| 8,120,451 B2 * | 2/2012 | Yoon et al. | 335/78 |
| 8,238,074 B2 * | 8/2012 | Steeneken | 361/290 |
| 2002/0171517 A1 * | 11/2002 | Guo et al. | 333/262 |
| 2004/0075158 A1 | 4/2004 | Nakayama | |
| 2007/0278075 A1 * | 12/2007 | Terano et al. | 200/181 |
| 2009/0001845 A1 | 1/2009 | Ikehashi | |
| 2009/0207549 A1 * | 8/2009 | Shimanouchi et al. | 361/281 |
| 2009/0237858 A1 | 9/2009 | Steeneken et al. | |
| 2011/0127878 A1 | 6/2011 | Yamazaki | |

FOREIGN PATENT DOCUMENTS

JP   2006165380 A   *   6/2006
JP   2008-541420   11/2008

OTHER PUBLICATIONS

Japanese Office Action for Japanese Application No. 2009-214849 mailed on Jan. 31, 2012.
Bezooijen, et al. A GSM/EDGE/WCDMA Adaptive Series-LC Matching Network Using RF-MEMS Switches, IEEE J. Solid-State Circuits, vol. 43, No. 10, pp. 2259-2268, Oct. 2008.

* cited by examiner

*Primary Examiner* — David M Sinclair
(74) *Attorney, Agent, or Firm* — Turocy & Watson, LLP

(57) ABSTRACT

Provided is a MEMS device that includes first and second lower electrodes on a substrate. The MEMS device also includes a first driving electrode forming a capacitance element having a first capacitance between the first lower electrode and the first driving electrode, a second driving electrode forming a capacitance element having a second capacitance between the second lower electrode and the second driving electrode, and an upper electrode supported in midair above the driving electrodes. The upper electrode moves toward the driving electrodes and has a variable third capacitance between the first driving electrode and the upper electrode and a variable fourth capacitance between the second driving electrode and the upper electrode.

20 Claims, 20 Drawing Sheets

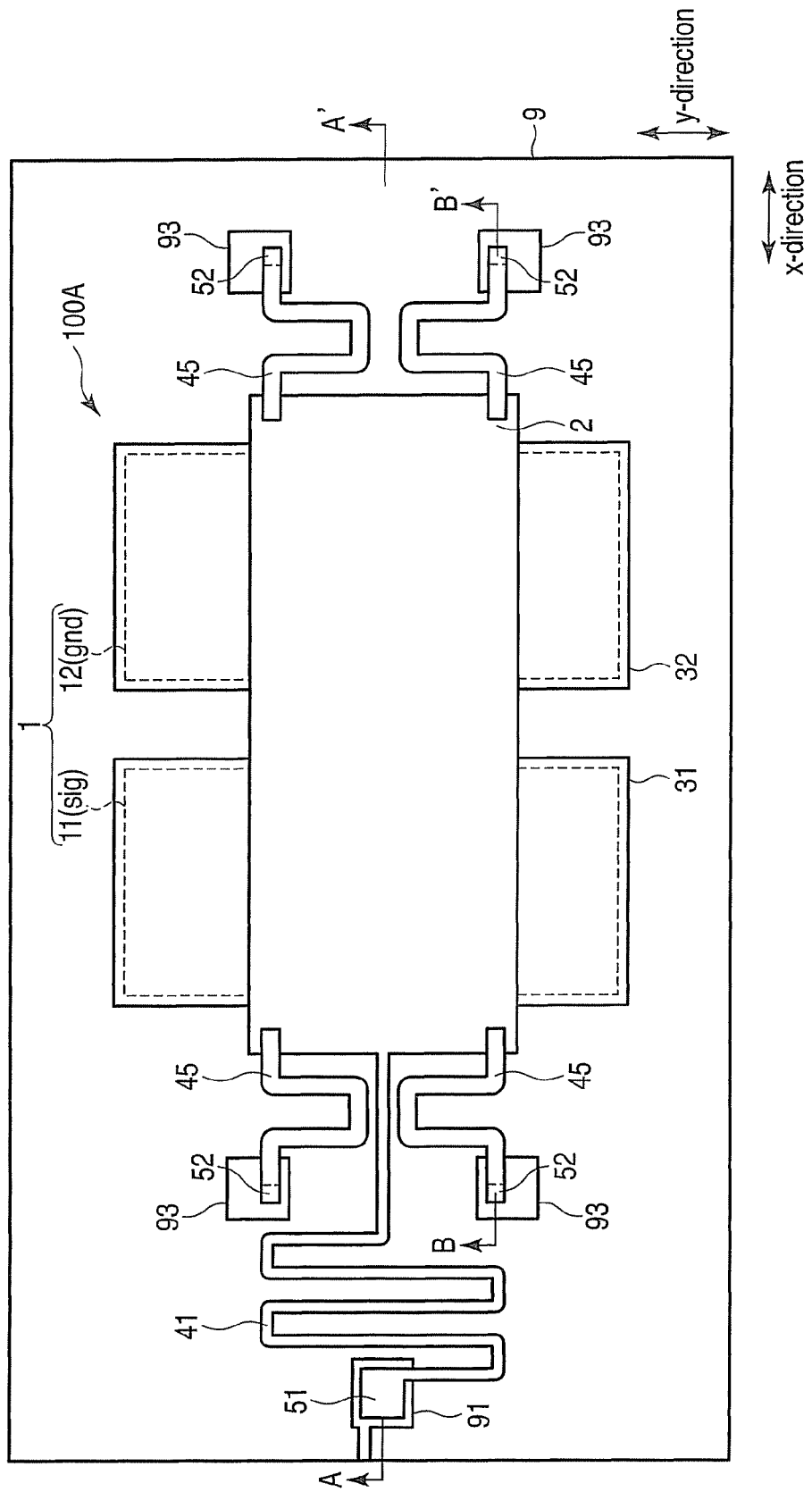
F I G. 1

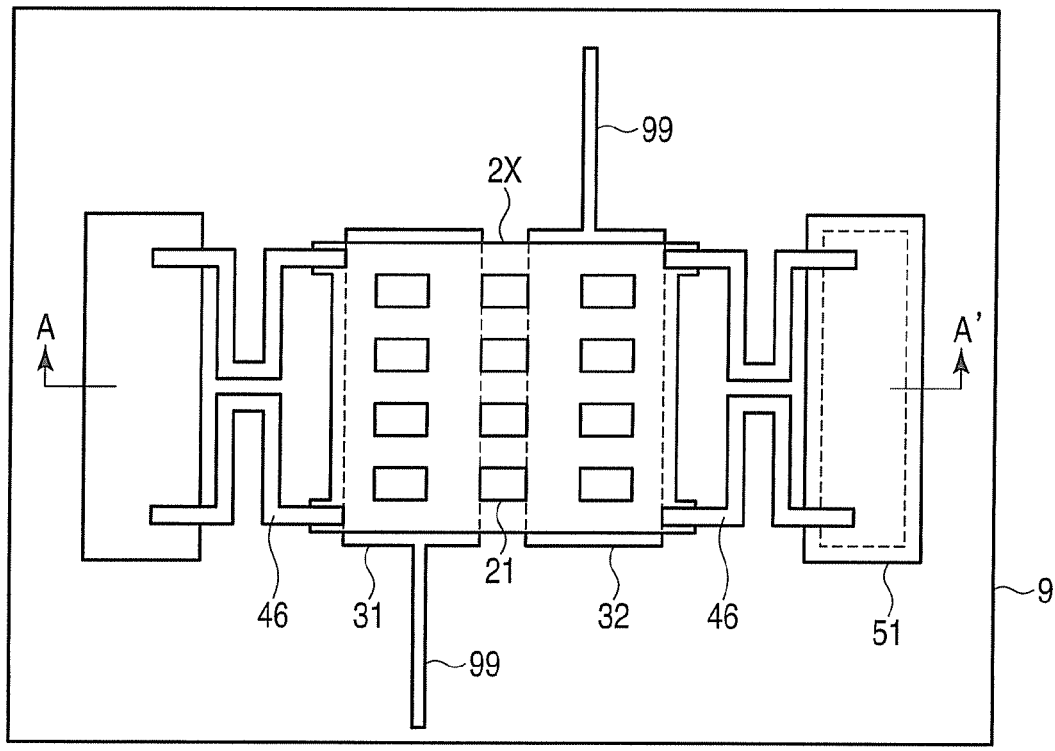
F I G. 6A
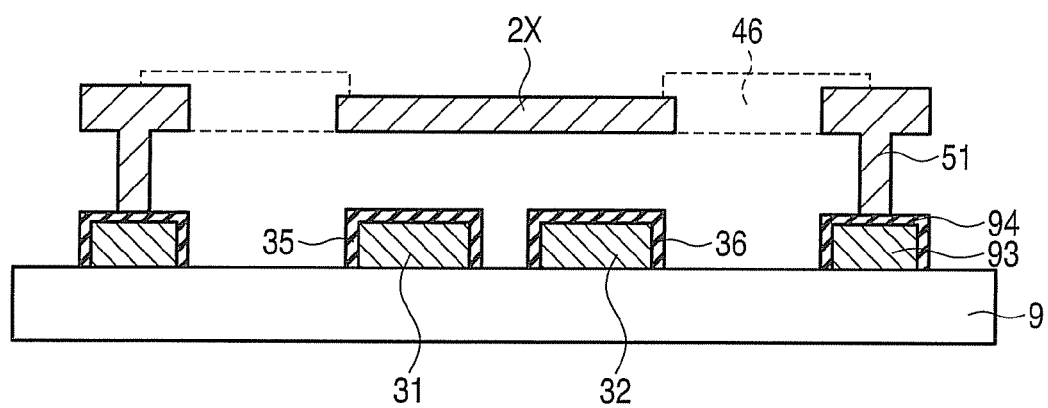
F I G. 6B

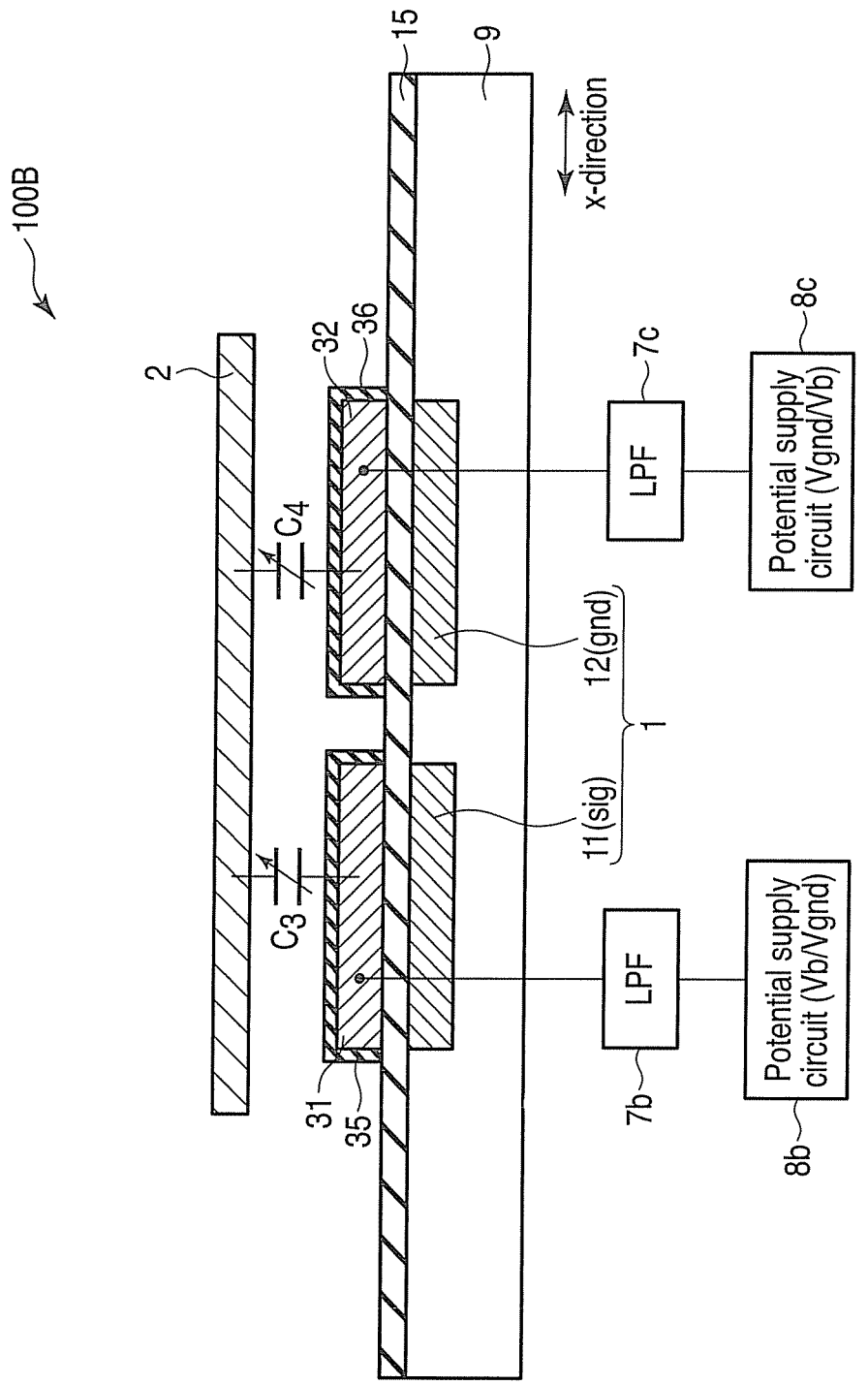
F I G. 10B

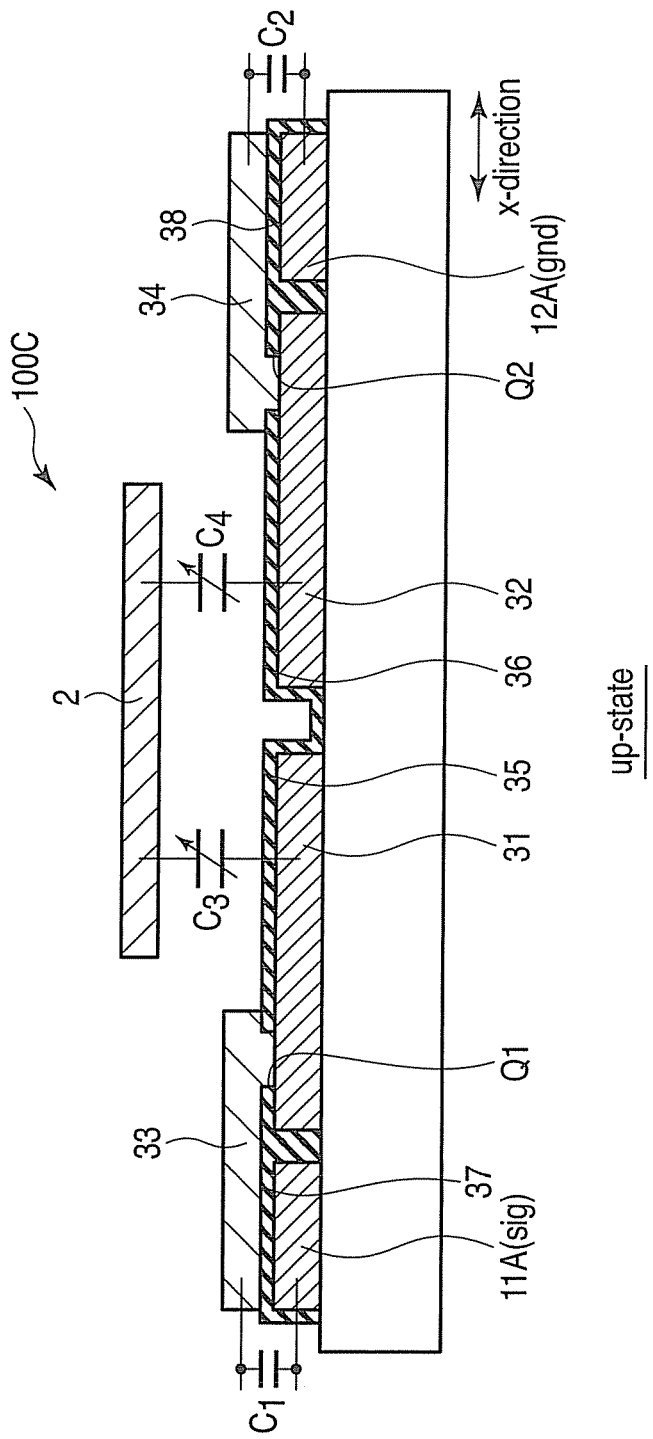
F I G. 12A

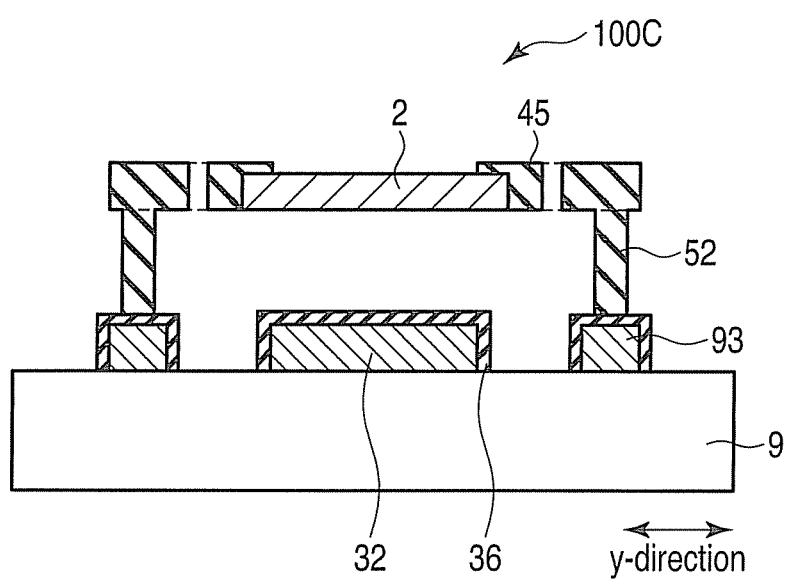
F I G. 12B down-state

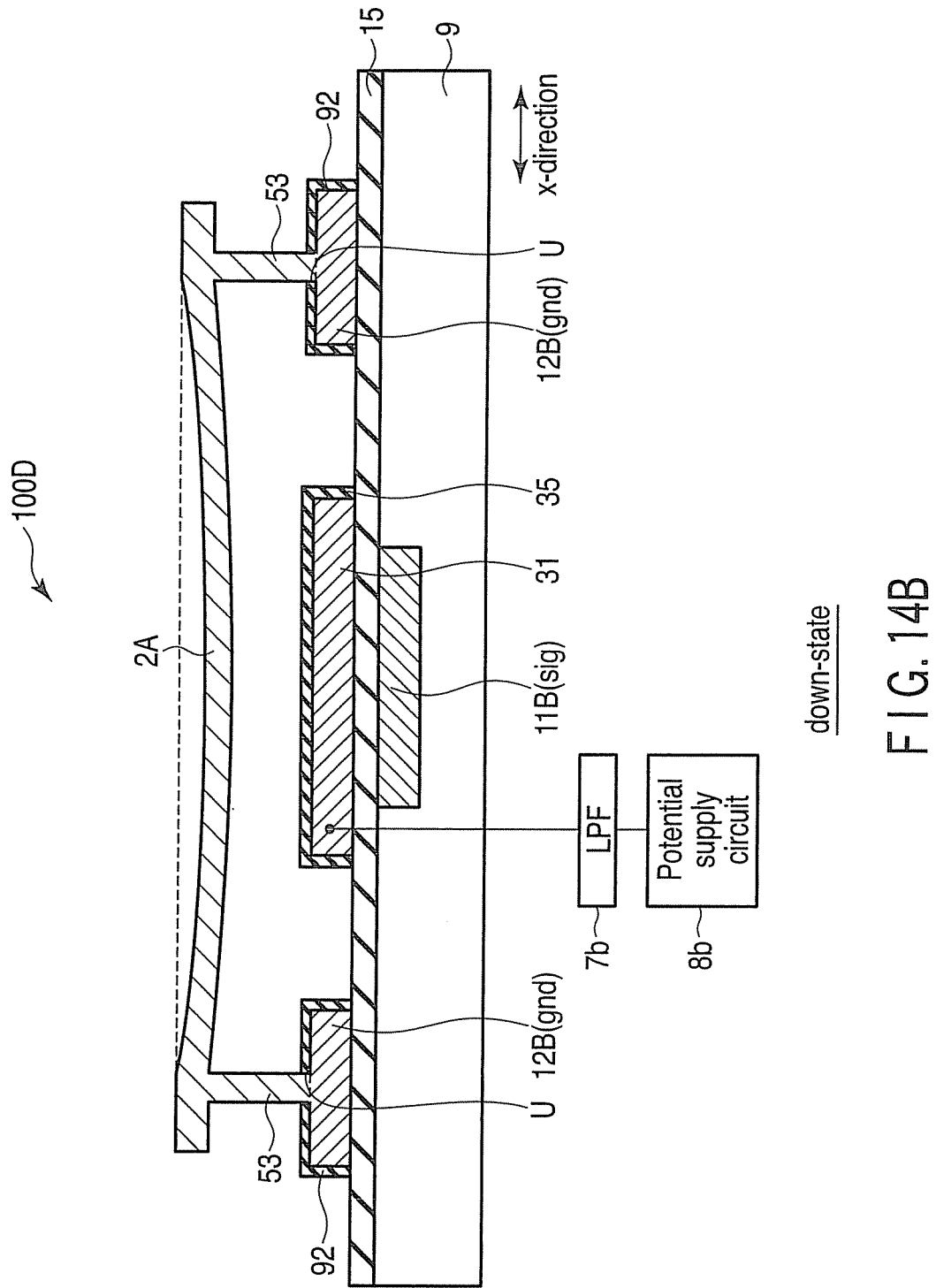
F I G. 14B

MEMS DEVICE

CROSS-REFERENCE TO RELATED APPLICATIONS

This application is based upon and claims the benefit of priority from Japanese Patent Application No. 2009-214849, filed Sep. 16, 2009; the entire contents of which are incorporated herein by reference.

FIELD

Embodiments described herein relates generally to a MEMS (micro-electro-mechanical systems) device.

BACKGROUND

Devices (hereinafter referred to as "MEMS variable capacitance devices") in which MEMS are applied to variable capacitance elements can achieve low loss, high isolation and high linearity, and therefore are expected as key devices for achieving multiband and multimode portable terminals as the next generation portable terminals.

When applied to a wireless system based on GSM (global system for mobile communications) standards, a MEMS variable capacitance device is required to perform switching in a state in which radio frequency (RF) power of the order of 35 dBm is applied. That is, with the RF power of the order of 35 dBm being applied, a movable upper capacitance electrode included in the MEMS variable capacitance device needs to be returned from a state (down-state) in which the upper capacitance electrode is lowered toward a lower capacitance electrode side to a state (up-state) in which the upper capacitance electrode is pulled upward from the lower capacitance electrode side. Such switching operation when RF power is applied is referred to as "hot switching".

One method for achieving hot switching is to increase the spring constant of a spring structure (or a support member) connected to an upper capacitance electrode. However, if the spring constant of the spring structure is increased, the operation of pulling up the upper capacitance electrode from the lower capacitance electrode side becomes easier, whereas a large driving force (e.g., electrostatic attraction) becomes necessary for the operation of pulling down the upper capacitance electrode toward the lower capacitance electrode side.

To obtain a large driving force, a driving voltage for driving the MEMS variable capacitance device needs to be increased, or the area of a driving electrode needs to be increased.

In the case of increasing a driving voltage to obtain a large driving force, there arise problems, such as the increased area of a boost circuit which boosts a potential supplied from the outside up to the driving voltage, the increased power consumption, and longer switching time.

In the case of increasing the area of a driving electrode to obtain a large driving force, the chip area is increased, which leads to increased manufacturing cost.

BRIEF DESCRIPTION OF THE DRAWINGS

FIG. 1 is a plan view illustrating the structure of a MEMS device according to a first embodiment;

FIGS. 6A, 6B and 7 illustrate a verification result;

FIG. 10B illustrates the operation of the MEMS device according to the second embodiment;

FIGS. 12A and 12B are cross-sectional views illustrating the structure of the MEMS device according to the third embodiment;

FIGS. 14A and 14B are cross-sectional views illustrating the structure of the MEMS device according to the fourth embodiment.

DETAILED DESCRIPTION

Figure 2A:
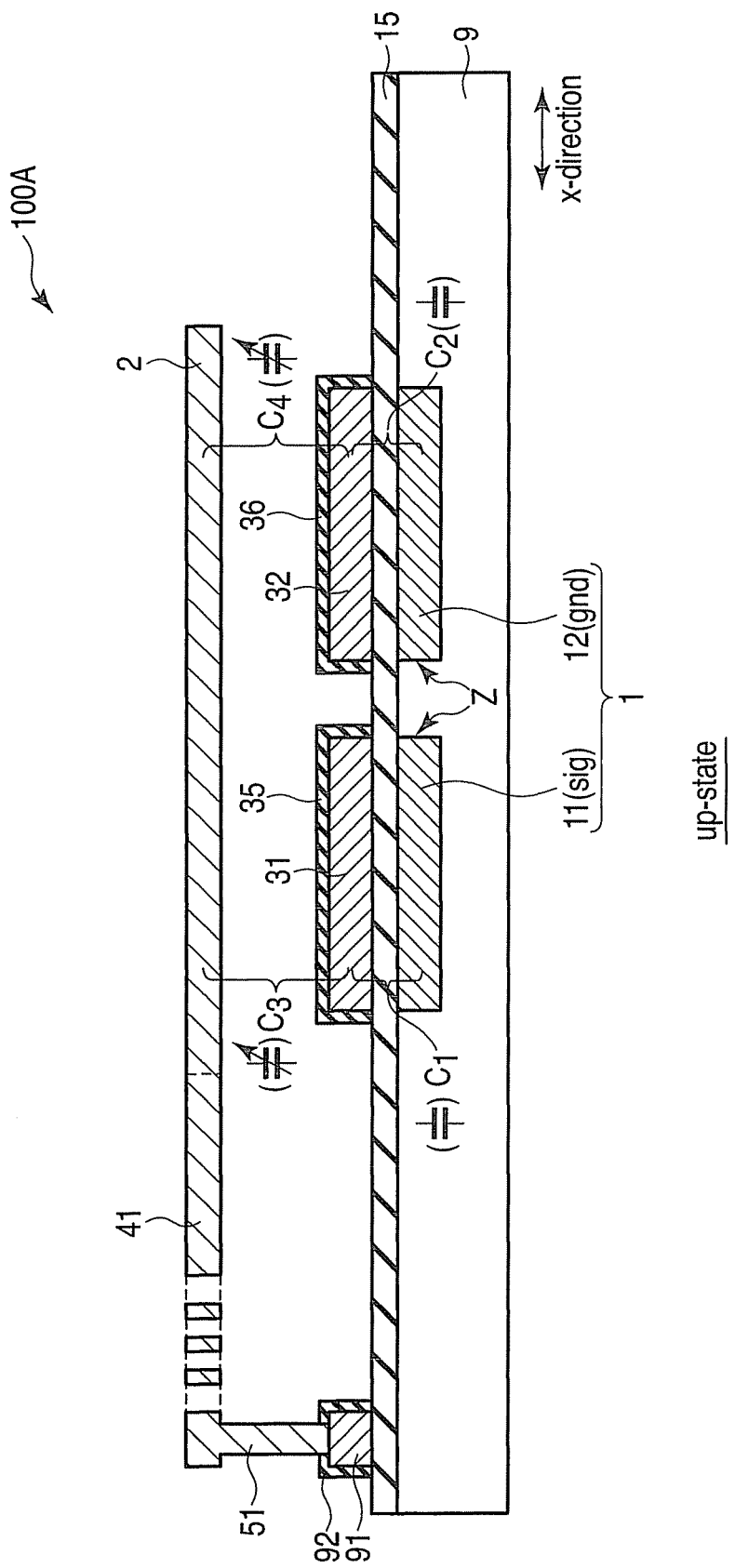
FIGS. 2A and 2B are cross-sectional views illustrating the structure of the MEMS device according to the first embodiment.

Embodiments will be described in detail below with reference to the accompanying drawings. Hereinafter, elements having the same functions and configurations are denoted by the same reference characters, and an overlapping description is given as necessary.

In general, according to one embodiment, a MEMS device includes first and second lower electrodes on a substrate; a first driving electrode which forms a fixed capacitance element having a first capacitance between the first lower electrode and the first driving electrode; a second driving electrode which forms a fixed capacitance element having a second capacitance between the second lower electrode and the second driving electrode; and an upper electrode which is supported in midair above the first and second driving electrodes and which moves toward the first and second driving electrodes and which has a variable third capacitance between the first driving electrode and the upper electrode and has a variable fourth capacitance between the second driving electrode and the upper electrode. A capacitance value between the first and second lower electrodes is determined by a value of a composite capacitance of the first, second, third and fourth capacitances connected in series, and the value of the composite capacitance connected in series is used as a variable capacitance value.

EMBODIMENTS (1) First Embodiment

With reference to FIGS. 1 to 8, a MEMS device according to a first embodiment is described.

(a) Structure

Figure 2B:
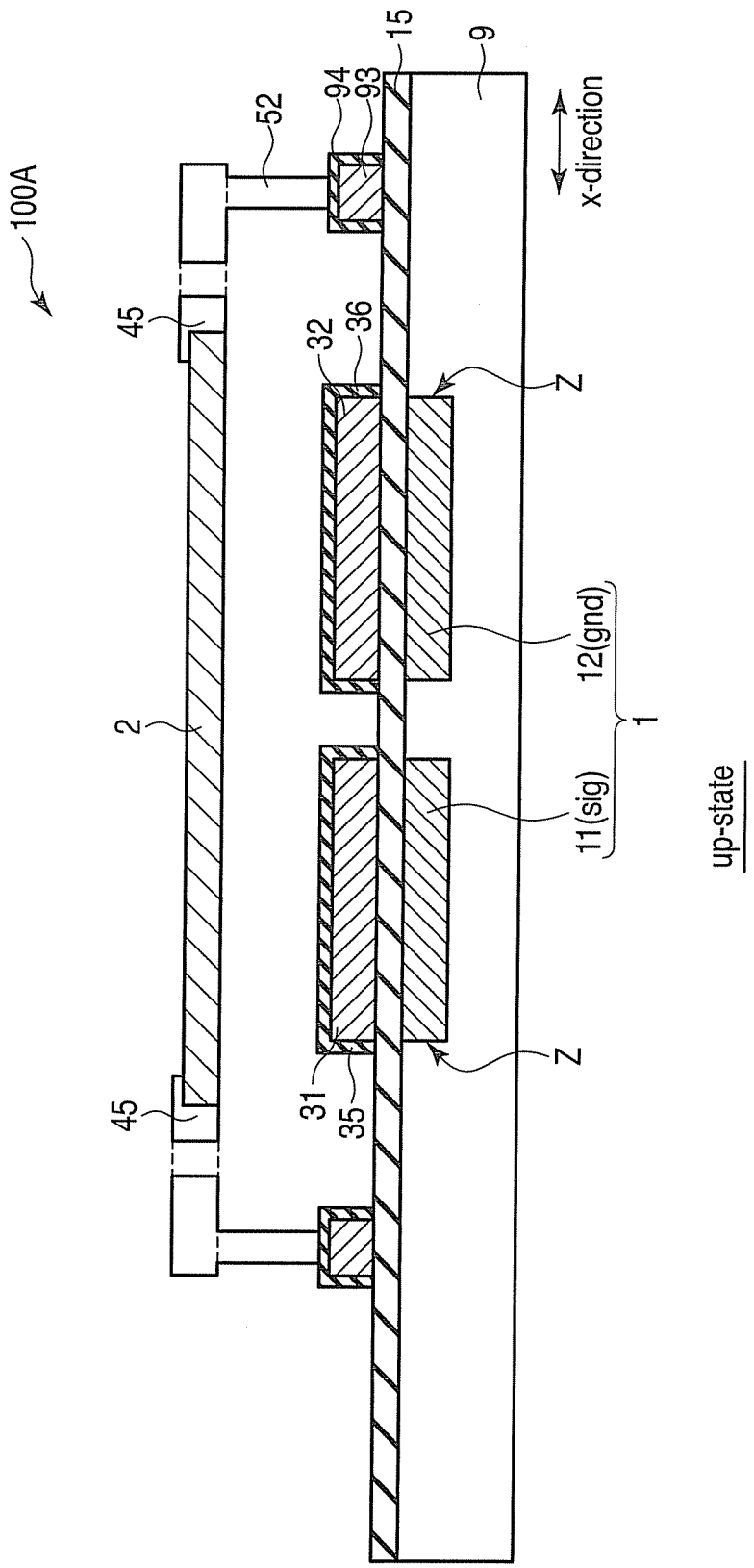

Referring to FIGS. 1, 2A and 2B, the structure of the MEMS device according to the first embodiment is described. FIG. 1 illustrates a planar structure of the MEMS device according to this embodiment. FIGS. 2A and 2B illustrate cross-sectional structures of the MEMS device according to this embodiment. FIG. 2A illustrates a cross-sectional structure taken along the line A-A' of FIG. 1, and FIG. 2B illustrates a cross-sectional structure taken along the line B-B' of FIG. 1.

The MEMS device according to this embodiment is, for example, a MEMS variable capacitance device.

As illustrated in FIGS. 1, 2A and 2B, a MEMS variable capacitance device 100A according to this embodiment is provided on a substrate 9. The substrate 9 is, for example, an insulating substrate of glass or the like, or an interlayer insulating film provided on a silicon substrate.

In cases where an interlayer insulating film on a silicon substrate is used for the substrate 9, elements such as field effect transistors may be provided in a surface region (semiconductor region) of the silicon substrate. These elements form a logic circuit and a storage circuit. The interlayer insulating film is provided on the silicon substrate to cover the circuits. The MEMS variable capacitance device is therefore provided above the circuits on the silicon substrate. Note that it is preferable that a circuit, such as an oscillator, which functions as the source of noise be not disposed below the MEMS variable capacitance device 100A. Note also that a shield metal may be provided within the interlayer insulating film to suppress noise propagation from an underlying circuit to the MEMS variable capacitance device 100A.

To make small the parasitic capacitance of the interlayer insulating film on the silicon substrate, the use of a material having a low dielectric constant is desirable. For example, TEOS (tetra ethyl ortho silicate) is used for the interlayer insulating film. To make small the parasitic capacitance, the thickness of the interlayer insulating film is desirably large. The thickness of the interlayer insulating film as the substrate 9 is preferably, for example, 10 μm or more.

The MEMS variable capacitance device 100A includes, for example, a lower capacitance electrode (lower electrode) 1 and an upper capacitance electrode (upper electrode) 2. The lower capacitance electrode 1 and the upper capacitance electrode 2 make up one variable capacitance element.

In this embodiment, the lower capacitance electrode 1 is formed of a signal electrode (first lower electrode) 11 and a ground electrode (second lower electrode) 12. The signal electrode 11 and the ground electrode 12 are paired such that a potential difference between the two electrodes 11 and 12 is handled as output (RF power/RF voltage) of the MEMS variable capacitance device 100A. The potential of the signal electrode 11 is variable, and the potential of the ground electrode 12 is set to a certain potential (e.g., ground potential).

The signal electrode 11 and the ground electrode 12 are, for example, buried within grooves Z in the substrate 9 and are fixed in the substrate 9. The signal electrode 11 and the ground electrode 12 extend, for example, in the y-direction.

Examples of the material used for the signal electrode 11 and the ground electrode 12 include metals, such as aluminum (Al), copper (Cu) and gold (Au), and alloys including any one of these metals.

An insulating film 15 is provided on the top surfaces of the signal electrode 11 and the ground electrode 12.

The upper capacitance electrode 2 is provided above the signal electrode 11 and the ground electrode 12. The upper capacitance electrode 2 is supported in midair, for example, through a plurality of spring structures 41 and 45 by anchor portions 51 and 52. The upper capacitance electrode 2 is movable and moves in a vertical direction (perpendicular direction) with respect to the surface of the substrate 9. The upper capacitance electrode 2, for example, has a quadrilateral plane shape and extends in the x-direction. Note that the upper capacitance electrode 2 may have an opening portion (through-hole) which passes through from the top surface thereof toward the bottom surface thereof.

Examples of the material used for the upper capacitance electrode 2 include metals, such as aluminum (Al), aluminum alloy, copper (Cu), gold (Au) and platinum (Pt).

Connected to the upper capacitance electrode 2 is an end of the first spring structure 41. The first spring structure 41, for example, is formed integrally with the upper capacitance electrode 2, and the upper capacitance electrode 2 and the first spring structure 41 are in a continuous single layer structure in which they are combined into one layer. The first spring structure 41 has, for example, a meandering plane shape.

Connected to the other end of the first spring structure 41 is the anchor portion 51. The anchor portion 51 is provided, for example, on an interconnect 91. The interconnect 91 is provided on the insulating film 15 covering the surface of the substrate 9. The surface of the interconnect 91 is covered with an insulating film 92. The insulating film 92 is provided with an opening portion. Through the opening portion, the anchor portion 51 is directly in contact with the interconnect 91.

The first spring structure 41 is formed of, for example, a conductor, and the same material as that of the upper capacitance electrode 2 is used. In this case, a metal such as Al, Al alloy, Cu, Au or Pt is used for the first spring structure 41. The anchor portion 51 is formed of, for example, a conductor and is formed of the same material as that of the spring structure 41. However, a material different from those of the upper capacitance electrode 2 and the spring structure 41 may be used for the anchor portion 51.

A potential (voltage) is supplied to the upper capacitance electrode 2 through the first spring structure 41, the anchor portion 52 and the interconnect 91.

The second spring structures 45 are connected one by one to four corners of the rectangular upper capacitance electrode 2. One end of the second spring structure 45 is provided on the upper capacitance electrode 2. A junction between the second spring structure 45 and the upper capacitance electrode 2 is in a stacked structure. The other end of the second spring structure 45 is connected to the anchor portion 52. The anchor portion 52 is provided on dummy layers 93 and 94. The dummy layers 93 and 94 are provided on the insulating film 15 covering the surface of the substrate 9.

The second spring structure 45 is formed of, for example, a material different from that of the first spring structure 41. The material used for the second spring structure 45 is, for example, a brittle material. The term "brittle material" means a material configured such that when stress is applied to a member made of the material for the purpose of destroying the member, the member is destroyed almost without a plastic change (change in shape).

As the material used for the second spring structure 45, materials having insulating properties, such as silicon oxide and silicon nitride, may be used, and semiconductor materials, such as poly silicon (poly-Si), silicon (Si) and silicon germanium (SiGe) and materials having electrical conductivity, such as tungsten (W), molybdenum (Mo) and aluminum-titanium (AlTi) alloy, may also be used. In this embodiment, however, materials other than the brittle materials may be used for the second spring structure 45, and the same material (conductor) as that used for the first spring structure may also be used.

Note that the material used for the first spring structure 41 is, for example, a ductile material. The term "ductile material" means a material configured such that when stress is applied to a member made of the material for the purpose of destroying the member, a large plastic change (ductility) occurs in the member and then the member is destroyed. Typically, the energy (stress) required for destroying a member using a brittle material is smaller than the energy required for destroying a member using a ductile material. That is, a member using a brittle material is more likely to be destroyed than a member using a ductile material.

A spring constant k2 of the spring structure 45 using a brittle material is made larger than a spring constant k1 of the spring structure 41 using a ductile material, for example, by setting the line width of the spring structure 45, the film thickness of the spring structure 45, and a curve portion (flexure) of the spring structure 45 as appropriate.

When the spring structures 41 and 45 of ductile and brittle materials are connected to the upper electrode 2 as in this embodiment, the interval between capacitance electrodes in a state in which the upper capacitance electrode 2 has been pulled upward (referred to as an "up-state") is substantially determined by the spring constant k2 of the spring structure 45 using a brittle material.

As described above, the spring structure 45 using a brittle material is less likely to creep. Therefore, even when driving of the MEMS variable capacitance device 100A is repeated a plurality of times, the variation of the interval between capacitance electrodes is small during the up-state. Note that creep of a material means a phenomenon in which, when stress is applied to a certain member, distortion (change in shape) of the member increases.

The spring structure 41 using a ductile material creeps by a plurality of driving operations. However, the spring constant k1 of the spring structure 41 is set smaller than the spring constant k2 of the spring structure 45 using a brittle material. Accordingly, the change in shape (bend) of the spring structure 41 using a ductile material has no large effect on the interval between the capacitance electrodes during the up-state.

In this way, a spring structure using a ductile material and a spring structure using a brittle material are applied to a MEMS device. This makes it possible to provide a MEMS device (MEMS variable capacitance device) having small characteristic deterioration caused by creeping while maintaining an advantage of low loss.

The material used for the anchor portion 52 may be, for example, the same as that of the second spring structure 45 (e.g., a brittle material), and may also be the same as that of the anchor portion 51 (e.g., ductile material).

First and second lower driving electrodes (driving electrodes) 31 and 32 are provided between the lower capacitance electrodes 11 and 12 and the upper electrode 2. A cavity is provided between the upper capacitance electrode 2 and the lower driving electrodes 31 and 32.

The lower driving electrodes 31 and 32 are stacked above the lower capacitance electrodes 11 and 12 with the insulating film 15 interposed therebetween. More specifically, the first lower driving electrode 31 is provided above the signal electrode 11 with the insulating film 15 interposed therebetween. The second lower driving electrode 32 is provided above the ground electrode 12 with the insulating film 15 interposed therebetween. Note that the lower driving electrodes 31 and 32 may be stacked above the signal electrode 11 and the ground electrode 12 provided on the top surface of the substrate 9 with an insulating film interposed therebetween.

The lower driving electrodes 31 and 32 have rectangular plane shapes, and extend, for example, in the y-direction. The surfaces of the lower driving electrodes 31 and 32 are covered with, for example, insulating films 35 and 36. The lower driving electrodes 31 and 32 are fixed onto the insulating film 15.

Note that while, in this embodiment, the lower driving electrodes 31 and 32 are illustrated such that their dimensions in the x-direction and the y-direction are the same as those of the lower capacitance electrodes 11 and 12, the dimensions are not limited to those in this embodiment. For example, the dimensions in the x-direction of the lower driving electrodes 31 and 32 may be larger than those in the x-direction of the lower capacitance electrodes 11 and 12, and the dimensions in the y-direction of the lower driving electrodes 31 and 32 may be smaller than those in the y-direction of the lower capacitance electrodes 11 and 12.

Examples of the material used for the lower driving electrodes 31 and 32 include metals, such as aluminum (Al), aluminum alloy, and copper (Cu). Examples of the material used for the insulating films 35 and 36 include insulators, such as a silicon oxide film, a silicon nitride film and a high dielectric (high-k) film.

Note that, for example, the same material as that used for the lower driving electrodes 31 and 32 is used for the interconnect 91 and the dummy layer 93, and the thicknesses of the interconnect 91 and the dummy layer 93 are the same as those of the lower driving electrodes 31 and 32. The same material as that used for the insulating films 35 and 36 covering the lower driving electrodes 31 and 32 is used for the insulating films 92 and 94 respectively covering the interconnect 91 and the dummy layer 93, and the thicknesses of the insulating films 92 and 94 are the same as those of the insulating films 35 and 36.

As described above, the upper electrode 2 is included together with the lower capacitance electrodes 11 and 12 in a variable capacitance element. Further, in this embodiment, the upper electrode 2 functions as a driving electrode which is paired with the two lower driving electrodes 31 and 32. That is, in the MEMS variable capacitance device 100A of this embodiment, an actuator is formed of the upper electrode 2 and the two lower driving electrodes 31 and 32. Hereinafter, the movable upper electrode 2 included in a MEMS variable capacitance device is referred to as an "upper capacitance/driving electrode 2". A structure in which the lower driving electrodes 31 and 32 are stacked above the lower capacitance electrodes 11 and 12 with the insulating film 15 interposed therebetween, as in this embodiment, is referred to as a "stacked electrode structure".

In the MEMS variable capacitance device 100A of this embodiment, a fixed capacitance element is formed of the lower capacitance electrodes 11 and 12 and the lower driving electrodes 31 and 32. The fixed capacitance element has given capacitances according to the facing area of the stacked electrodes, intervals between the stacked electrodes (the thickness of the insulating film 15) and the dielectric constant of the insulating film. Specifically, there exists a constant capacitance (first capacitance) $C_1$ between the signal electrode 11 and the lower driving electrode 31; there exists a constant capacitance (second capacitance) $C_2$ between the ground electrode 12 and the lower driving electrode 32. The values of the capacitance $C_1$ and the capacitance $C_2$ can be the same or different.

There exists capacitive coupling between the lower driving electrodes 31 and 32 and the upper capacitance/driving electrode 2. For example, there exists a variable capacitance (third capacitance) $C_3$ between the lower driving electrode 31 and the upper capacitance/driving electrode 2; there exists a variable capacitance (fourth capacitance) $C_4$ between the lower driving electrode 32 and the upper capacitance/driving electrode 2. As mentioned above, the upper capacitance/driving electrode 2 moves vertically with respect to the top surface of the lower driving electrodes 31 and 32, and therefore the value of the capacitive coupling varies. The capacitance $C_3$ and the capacitance $C_4$ have their respective upper limit values/lower limit values which can be the same or different.

The capacitance between the signal electrode 11 and the ground electrode 12 is formed of the capacitances $C_1$, $C_2$, $C_3$ and $C_4$ connected in series between the signal electrode 11 and the ground electrode 12. Note that it should be understood that the capacitance between the signal electrode 11 and the ground electrode 12 may include a parasitic capacitance between the signal electrode 11 and the ground electrode 12 in addition to the capacitances $C_1$, $C_2$, $C_3$ and $C_4$ connected in series between the signal electrode 11 and the ground electrode 12.

In the MEMS variable capacitance device 100A of this embodiment, applying a potential difference between the upper capacitance/driving electrode 2 and the lower driving electrodes 31 and 32 causes electrostatic attraction. Owing to the electrostatic attraction between the upper capacitance/driving electrode 2 and the lower driving electrodes 31 and 32, the upper capacitance/driving electrode 2 moves in the perpendicular direction (the vertical direction) to the substrate surface (lower driving electrode). As a result, the interval between the upper capacitance/driving electrode 2 and the lower capacitance electrode 1 varies. The variation in the distance between electrodes included in the capacitance element causes a variable capacitance value (capacitance) $C_{MEMS}$ of the MEMS variable capacitance device 100A to vary. With this variation, the potential of the capacitance electrode (here, the signal electrode 11) varies, so that an RF (radio frequency) signal is output from the capacitance electrode (signal/ground electrode).

In the MEMS device of this embodiment, the constant capacitances $C_1$ and $C_2$ and the variable capacitances (capacitive coupling) $C_3$ and $C_4$ are connected in series between the signal electrode 11 and the ground electrode 12. The capacitances (composite capacitance) $C_1$, $C_2$, $C_3$ and $C_4$ connected in series is a variable capacitance of the MEMS device 100A and is used as the variable capacitance for generating output (RF voltage $V_{RF}$).

The MEMS variable capacitance device 100A in which the movable upper electrode functions both as a capacitance electrode and as a driving electrode as in this embodiment is simple in its manufacturing method and is structurally robust compared to a MEMS variable capacitance device having a structure in which an upper capacitance electrode and an upper driving electrode are independent of each other.

(b) Operation

Referring to FIGS. 2A to 5B, the operation of the MEMS device according to the first embodiment is described.

Figure 3A:
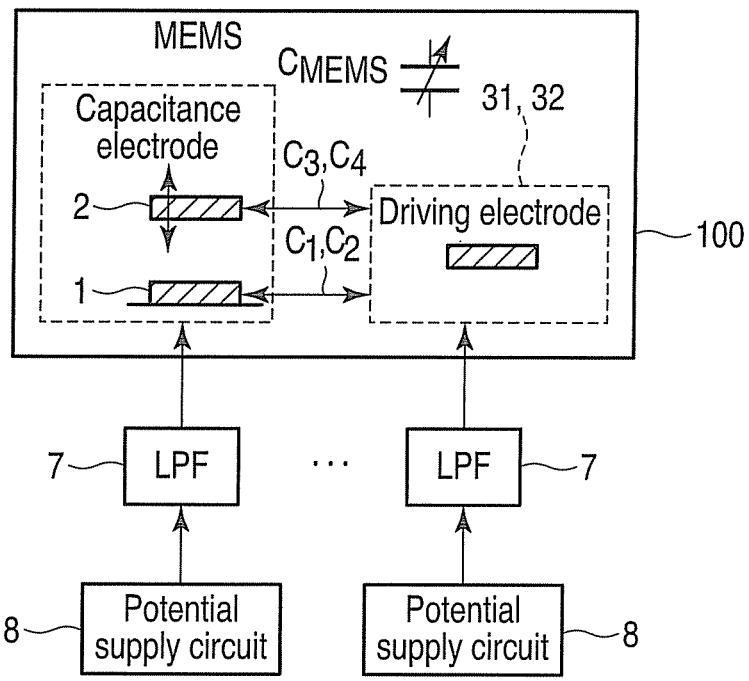
FIGS. 3A and 3B illustrate a configuration example for driving the MEMS device.
Figure 3B:
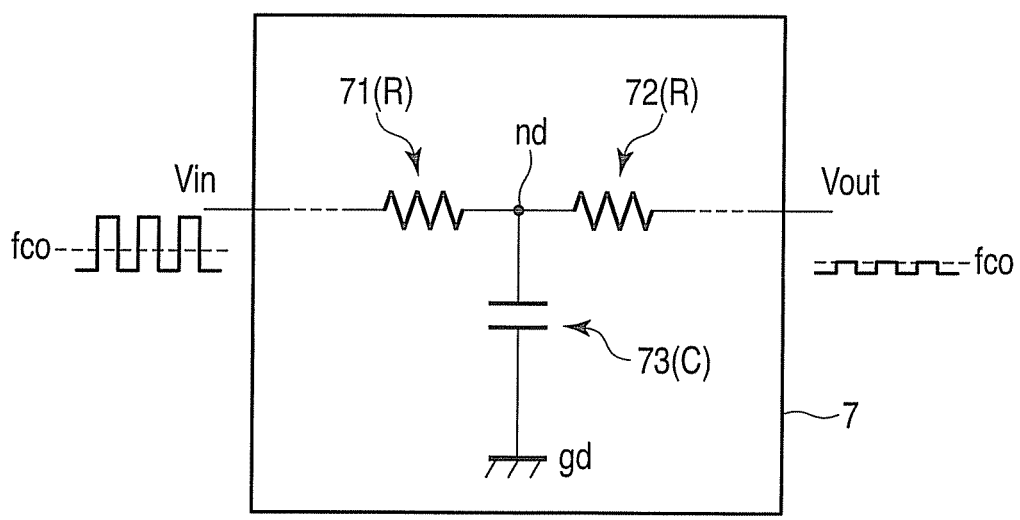

First, referring to FIGS. 3A and 3B, a description is given of schematic components for driving a MEMS variable capacitance device 100.

FIG. 3A schematically illustrates the whole configuration for driving the MEMS variable capacitance device 100.

As illustrated in FIG. 3A, in the MEMS variable capacitance device 100, the capacitance electrodes 1 and 2 and the driving electrodes 31 and 32 are connected through low pass filters (LPF) 7 to potential supply circuits 8.

The potential supply circuit 8 includes, for example, a boost circuit. The potential supply circuit 8 boosts a voltage input from the outside by a boost circuit so as to output a supply potential Vin. The supply potential Vin is input to the low pass filter 7. The supply potential Vin is a bias potential Vb or a ground potential Vgnd.

FIG. 3B is an equivalent circuit diagram illustrating one example of the low pass filter 7. In the example illustrated in FIG. 3B, the low pass filter 7 is formed of two resistance elements 71 and 72 and one fixed capacitance element 73. The two resistance elements 71 and 72 are connected in series. One end of the fixed capacitance element 73 is connected to a node nd of the two resistance elements 71 and 72 connected in series. The other end of the fixed capacitance element 73 is connected to, for example, a ground terminal gd.

On the basis of a cut-off frequency fco of the low pass filter 7, the low pass filter 7 cuts off a frequency component larger than the cut-off frequency fco included in an input signal (the supply potential Vin), and allows a frequency component equal to or less than the cut-off frequency fco included in the input signal to pass. A signal (output potential) Vout which has passed through the low pass filter 7 is supplied as the bias potential Vb or the ground potential Vgnd of the MEMS variable capacitance device 100 to the capacitance electrodes 1 and 2 and the driving electrodes 31 and 32.

The cut-off frequency fco of the low pass filter 7 is set using the resistance values of the resistance elements and the capacitance value of the fixed capacitance element, the resistance elements and the fixed capacitance element being included in the low pass filter 7. In the low pass filter 7 illustrated in FIG. 3B, its cut-off frequency fco is obtained by the inverse number of a time constant determined from resistance values R of the resistance elements 71 and 72 and a capacitance value C of the capacitance element 73. For example, when the cut-off frequency fco of the low pass filter is set to 0.7 MHz, the resistance value R and the capacitance value C in the two resistance elements 71 and 72 and the fixed capacitance element 73 are set so that the time constant determined from the resistance value R and the capacitance value C is the inverse number of 0.7 MHz.

The low pass filter 7 causes the output potential Vout of the low pass filter 7 to be a potential of a low frequency component compared to the frequency component (frequency band) of the supply potential Vin. In other words, the output potential Vout is caused to be a potential of a relatively direct-current component for the supply potential Vin. In this way, by inserting the low pass filters 7 between the potential supply circuits 8 and the electrodes 1, 2, 31 and 32, noise (high frequency component) generated from the potential supply circuits 8 is prevented from being propagated to the MEMS variable capacitance device 100, particularly to an RF output portion (the capacitance electrodes 1 and 2).

For example, when the cut-off frequency of the low pass filter 7 is set to 0.7 MHz, noise is decreased at a rate of −20 dB/decade by the low pass filter 7. Consequently, for example, in the MEMS variable capacitance device 100 used with a frequency band of 700 MHz or more, the propagation of noise to the MEMS variable capacitance device can be suppressed to −60 dB.

When the oscillation frequency (oscillator frequency) of the MEMS variable capacitance device in the state in which the electrode is held (hold state (up-state)) is set to 0.7 MHz, noise is decreased at a rate of −20 dB/decade. Therefore, for example, in the MEMS variable capacitance device used in a frequency band of 700 MHz or more, the propagation of noise to the MEMS variable capacitance device 100 can be suppressed to −60 dB.

Thus, when the cut-off frequency fco of the low pass filter is set to 0.7 MHz, and the oscillation frequency of the MEMS variable capacitance device 100 during the hold state is set to 0.7 MHz, the propagation of noise from the potential supply circuit 8 to the MEMS variable capacitance device 100 can be suppressed to −120 dB by inserting the low pass filters 7. This value (−120 dB) is sufficient to suppress the propagation of noise in many wireless systems.

Note that, in order to suppress the propagation of noise, a shield metal may be provided in a lower layer than a region (interconnect level) in which the MEMS variable capacitance device is provided, in addition to the insertion of the low pass filters 7. Further, the potential supply circuits (power supply line) 8 may be separately used for the MEMS variable capacitance device (RF output unit) and a driving/logic circuit provided on the surface of the silicon substrate, so that the propagation of noise is suppressed.

As described above, the noise of the potential supply circuits 8 to the RF output unit is reduced by the low pass filters 7. The potential Vout with the reduced noise is supplied as the bias potential Vb (or the ground potential Vgnd) to the MEMS variable capacitance device 100. The MEMS variable capacitance device 100 is driven by the potentials supplied to the upper driving electrode and the lower driving electrodes.

As illustrated in FIG. 3A, the MEMS variable capacitance device according to this embodiment has the capacitances $C_1$, $C_2$, $C_3$ and $C_4$, individually, between the capacitance electrodes 1 and 2 and the driving electrodes 31 and 32. The capacitances $C_1$, $C_2$, $C_3$ and $C_4$ improve the hot switching properties of the MEMS variable capacitance device 100.

Figure 4:
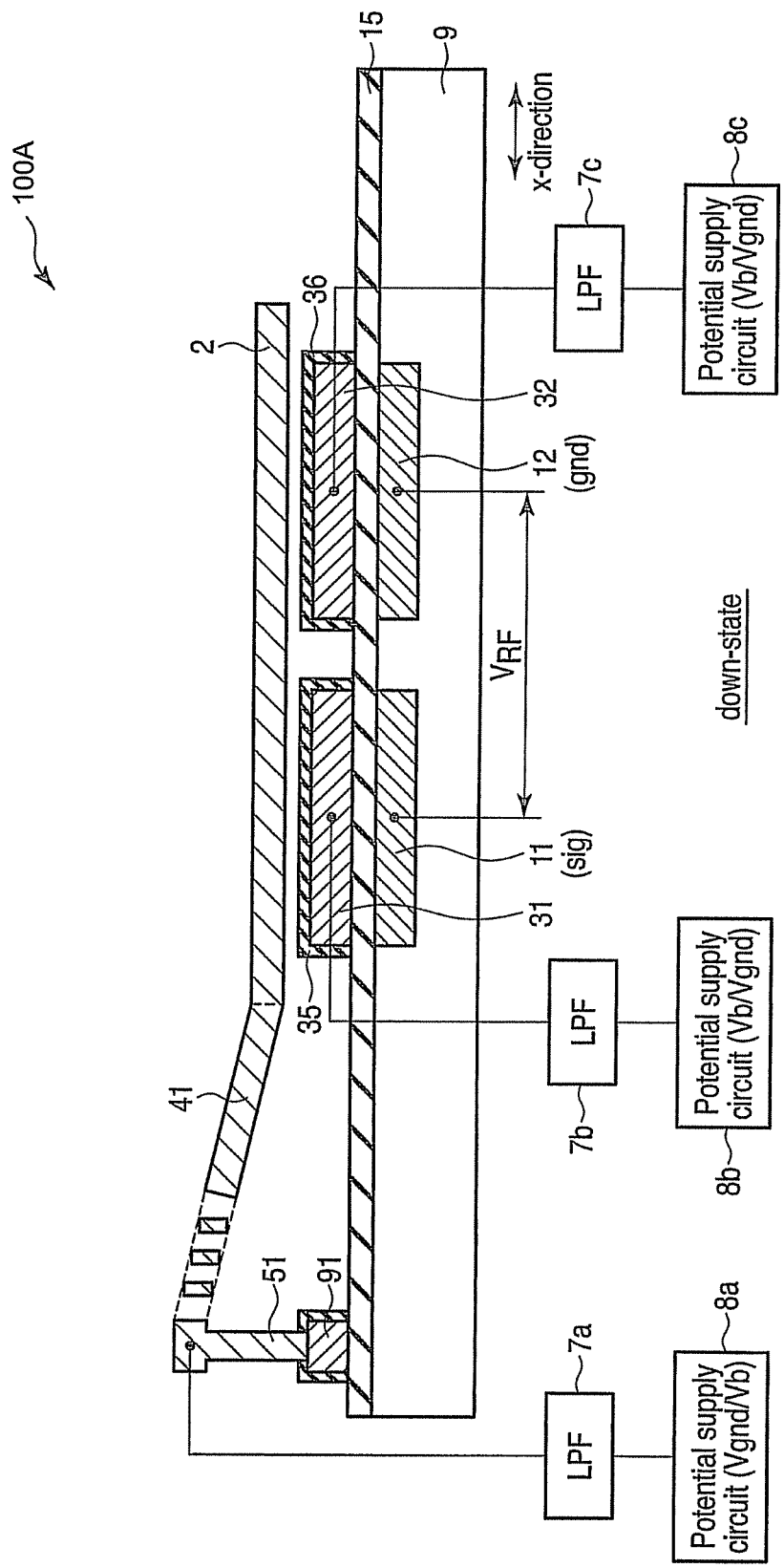
FIG. 4 illustrates the operation of the MEMS device according to the first embodiment.

Referring to FIGS. 2A, 4, 5A and 5B, the operation of the MEMS variable capacitance device 100A according to the first embodiment is described more specifically. The MEMS variable capacitance device 100A according to this embodiment is, for example, an electrostatically driven MEMS device. FIG. 4 illustrates the connection relationship among the electrodes 2, 31 and 32, low pass filters 7a, 7b and 7c, and potential supply circuits 8a, 8b and 8c in the MEMS variable capacitance device 100A of this embodiment. FIGS. 2A and 4 illustrate the respective different driven states of the MEMS variable capacitance device 100A when the device is being driven.

As illustrated in FIG. 4, the upper capacitance/driving electrode 2 is connected through the low pass filter 7a to the potential supply circuit 8a. The first lower driving electrode 31 is connected through the low pass filter 7b to the potential supply circuit 8b. The second lower driving electrode 32 is connected through the low pass filter 7c to the potential supply circuit 8c. In an example illustrated in FIG. 4, the two lower driving electrodes 31 and 32 are connected to the different potential supply circuits 8b and 8c, respectively. In this embodiment, however, when the two lower driving electrodes 31 and 32 are connected to the different low pass filters 7b and 7c, respectively, they may share one potential supply circuit.

In cases where the MEMS variable capacitance device 100A of this embodiment is driven, a potential difference is applied between the upper capacitance/driving electrode 2 and the lower driving electrodes 31 and 32.

For example, the ground potential Vgnd (e.g., 0 V) is supplied to the upper capacitance/driving electrode 2, and the bias potential Vb is supplied to the lower driving electrodes 31 and 32, so that the MEMS variable capacitance device 100A is driven. In cases where the upper capacitance/driving electrode 2 is driven downward, the bias potential Vb is, for example, about 30 V.

In contrast to this, the bias potential Vb may be supplied to the upper capacitance/driving electrode 2, and the ground potential Vgnd may be supplied to the lower driving electrodes 31 and 32, so that the MEMS variable capacitance device 100A is driven. The potentials supplied respectively to the upper capacitance/driving electrode 2 and the lower driving electrodes 31 and 32 may be such that the bias potential Vb and the ground potential Vgnd alternate with each other, so that the device is driven. Note that the supply of potentials is not limited to the case in which potentials having the same magnitude and the same polarity are supplied to both of the two lower driving electrodes 31 and 32.

Electrostatic attraction occurs by the applied potential difference between the electrode 2 and the electrodes 31 and 32.

When the potential difference between the upper capacitance/driving electrode 2 and the lower driving electrodes 31 and 32 is small or no potential difference exists, as illustrated in FIG. 2A, the MEMS variable capacitance device 100A is in a state in which the upper capacitance/driving electrode 2 is raised up.

Once the potential difference between the upper capacitance/driving electrode 2 and the lower driving electrodes 31 and 32 becomes equal to or more than a certain value, the electrostatic attraction which occurs between the upper capacitance/driving electrode 2 and the lower driving electrodes 31 and 32 causes the movable upper capacitance/driving electrode 2 to start moving to be pulled toward the lower driving electrodes 31 and 32. As a result, the upper capacitance/driving electrode 2 drops toward the lower driving electrodes 31 and 32. The potential difference with which the movable upper capacitance/driving electrode 2 starts moving is referred to as a "pull-in voltage".

In this embodiment, the state in which once the potential difference between the upper driving electrode 2 and the lower driving electrodes 31 and 32 becomes equal to or more than a certain value (pull-in voltage), for example, as illustrated in FIG. 4, the upper capacitance/driving electrode 2 drops toward the lower driving electrodes 31 and 32 is referred to as a "down-state". In contrast, the state in which the potential difference between the upper driving electrode 2 and the lower driving electrodes 31 and 32 is less than the pull-in voltage, and, for example, as illustrated in FIG. 2A, the upper capacitance/driving electrode 2 is raised up is referred to as an "up-state".

The MEMS variable capacitance device 100A of this embodiment has a structure in which the lower driving electrodes 31 and 32 are stacked above the lower capacitance electrodes (signal/ground electrodes) 11 and 12. Therefore, the operation in which the upper capacitance/driving electrode 2 is lowered toward the side of the lower driving electrodes 31 and 32 is the same as the operation in which the upper capacitance/driving electrode 2 is lowered toward the side of the lower capacitance electrodes 11 and 12.

Consequently, the inter-electrode distance between the upper capacitance/driving electrode 2 and the lower capacitance electrode 1 included in the variable capacitance element varies between the MEMS variable capacitance device 100A during the up-state and the MEMS variable capacitance device 100A during the down-state.

In the MEMS variable capacitance device of this embodiment, the potential of one electrode 11 (signal electrode) of the two electrodes 11 and 12 forming the lower capacitance electrode 1 is variable whereas the potential of the other electrode (ground electrode) 12 is fixed.

The varying inter-electrode distance between the upper capacitance electrode 2 and the lower capacitance electrodes 11 and 12 causes the potential of the signal electrode 11, of the two lower capacitance electrodes which are paired, to vary between a value in the down-state and a value in the up-state. On the other hand, during the operation of the MEMS variable capacitance device 100A, the ground electrode 12 of the two lower capacitance electrodes 1 is fixed to a constant potential (e.g., the ground potential). For this reason, the potential of the ground electrode 12 does not vary even when the upper capacitance/driving electrode 2 vertically moves.

The potential difference between the signal electrode 11 and the ground electrode 12 is output as an output signal (RF power or RF voltage) $V_{RF}$ to the outside according to the operation cycle of the MEMS variable capacitance device 100A in which the up-state and the down-state are repeated. The frequency of the output has a value in accordance with the operation cycle of the MEMS variable capacitance device 100A.

When the upper capacitance/driving electrode 2 is returned from the down-state to the up-state, the potential difference equal to or larger than a certain value (hereinafter referred to as a "pull-out voltage") is applied between the upper capacitance/driving electrode 2 and the lower driving electrodes 31 and 32.

As described above, as illustrated in FIG. 4, the low pass filter 7a is inserted between the upper capacitance/driving electrode 2 and the potential supply circuit 8a. This causes the upper capacitance/driving electrode 2 to be floating (in the floating state) regarding the radio frequency (RF). For this reason, in the MEMS variable capacitance device 100A of this embodiment, the upper electrode 2 functions as an upper capacitance electrode paired with the lower capacitance electrode 1, and also functions as an upper driving electrode paired with the lower driving electrodes 31 and 32.

In the foregoing configuration, the MEMS variable capacitance device 100A according to this embodiment demonstrates high hot switching properties. The term "hot switching" means switching (driving) of the movable upper electrode 2 in a state in which an RF voltage is output, that is, in a state in which RF power is applied.

Figure 5A:
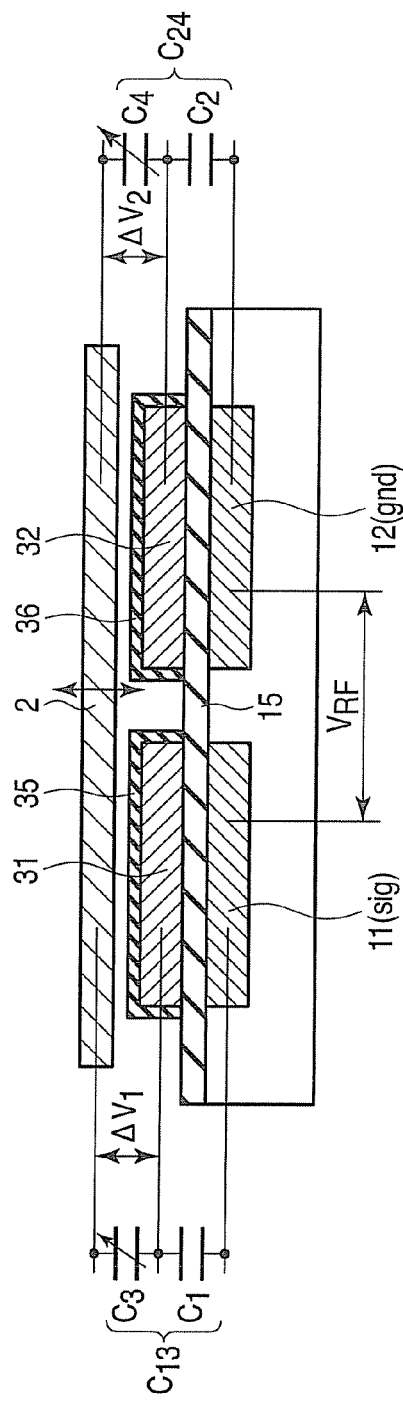
FIGS. 5A and 5B illustrate the operation of the MEMS device.
Figure 5B:
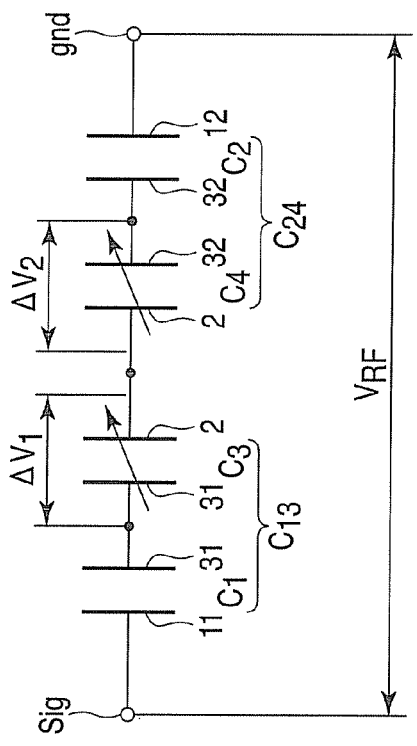

Referring to FIGS. 5A and 5B, the reason why the MEMS variable capacitance device 100A of this embodiment demonstrates high hot switching properties is described.

In a usual MEMS variable capacitance device, it is difficult to turn off the element, that is, to return an upper capacitance electrode to its up-state when RF power is applied, because electrostatic attraction between the upper capacitance electrode and a lower capacitance electrode is caused by the RF power (RF voltage).

In contrast, the MEMS variable capacitance device 100A of this embodiment, as illustrated in FIG. 5A, has the capacitances $C_1$, $C_2$, $C_3$ and $C_4$ among the electrodes 2, 11, 12, 31 and 32.

The lower capacitance electrode (signal electrode) 11 and the lower driving electrode 31, with the insulating film 15 interposed therebetween, form a fixed capacitance element having the capacitance $C_1$. Similarly, the lower capacitance electrode (ground electrode) 12 and the lower driving electrode 32 form a fixed capacitance element having the capacitance $C_2$. These fixed capacitance elements have MIM (metal-insulator-metal) structures. Hereinafter, a fixed capacitance element having the MIM structure is referred to as a "MIM capacitance element". The values of the capacitance $C_1$ and the capacitance $C_2$ can be the same or different.

The upper capacitance/driving electrode 2 and the lower driving electrode 31, with the insulating film 35 interposed therebetween, have capacitive coupling of the capacitance $C_3$. The upper capacitance/driving electrode 2 and the lower driving electrode 32, with the insulating film 36 interposed therebetween, have capacitive coupling of the capacitance $C_4$. With the upper capacitance/driving electrode 2 vertically actuated, the magnitude of the capacitance $C_3$ varies within the range according to the facing area of the upper capacitance/driving electrode 2 and the lower driving electrode 32. The capacitance $C_3$ and the capacitance $C_4$ have their respective upper limit values/lower limit values which can be the same or different.

In the capacitance/driving electrodes 2, 11, 12, 31 and 32 of the MEMS variable capacitance device 100A, as illustrated in FIG. 5B, they are equivalent to a circuit configuration in which the two fixed capacitances $C_1$ and $C_2$ and the two variable capacitances $C_3$ and $C_4$ are connected in series between a signal line sig and a ground line gnd. The capacitance between the signal electrode 11 and the ground electrode 12 is determined by the capacitances $C_1$, $C_2$, $C_3$ and $C_4$ connected in series between the signal electrode 11 and the ground electrode 12.

The capacitances (composite capacitance) $C_1$, $C_2$, $C_3$ and $C_4$ connected in series between the signal electrode 11 and the ground electrode 12 are used as a variable capacitance $C_{MEMS}$ of the MEMS device 100, that is, as the variable capacitance $C_{MEMS}$ for generating output (RF voltage $V_{RF}$).

Note that it should be understood that, in addition to the capacitances $C_1$, $C_2$, $C_3$ and $C_4$ connected in series between the signal electrode 11 and the ground electrode 12, a parasitic capacitance generated between the signal electrode 11 and the ground electrode 12 may further be included in the capacitance between the signal electrode 11 and the ground electrode 12.

In this embodiment, the capacitance (composite capacitance) including the fixed capacitances $C_1$ and $C_2$, which are constant, and capacitive coupling $C_3$ and $C_4$, which is variable, contributes to the operation and output of the MEMS variable capacitance device 100A. It has been described that the variation in potential of the signal electrode 11 is due to the variation in inter-electrode distance between the upper capacitance/driving electrode 2 and the signal electrode. However, it can be said, in other words, that the variation in value of the capacitive coupling $C_2$ in accordance with the operation (up/down-state) of the upper capacitance/driving electrode 2 causes the potential of the fixed capacitance $C_1$ to vary, and the variation in potential of the capacitance $C_1$ is reflected in the potential of the signal electrode 11.

Here, a potential difference $\Delta V_1$ applied between the upper capacitance/driving electrode 2 and the lower driving electrode 31 is expressed by the following expression 1A using the capacitances $C_1$ and $C_3$ and the RF voltage $V_{RF}$ resulting from the applied RF power. Note that, here, the case in which the capacitances $C_1$ and $C_2$ have the relationship $C_1=C_2$ and the capacitances $C_3$ and $C_4$ have the relationship $C_3=C_4$ is described for the purpose of simplification.

$$\Delta V_1 = V_{RF} \times C_1/(2(C_1+C_3)) \qquad \text{(expression 1A)}$$

As expressed by expression (1A), the potential difference $\Delta V_1$ correlates with $C_1/(2(C_1+C_3))$ and becomes smaller than the RF voltage $V_{RF}$.

Likewise, in the case where the capacitances $C_1$, $C_2$, $C_3$ and $C_4$ have the relationships $C_1=C_2$ and $C_3=C_4$, a potential difference $\Delta V_2$ applied between the upper capacitance/driving electrode 2 and the lower driving electrode 32 has the relationship $\Delta V_2 = \Delta V_1$. In this case, the potential difference $\Delta V_2$ can also be expressed by expression (1B).

$$\Delta V_2 = V_{RF} \times C_2/(2(C_2+C_4)) \qquad \text{(expression 1B)}$$

As expressed by expression (1B), the potential difference $\Delta V_2$ correlates with $C_2/(2(C_2+C_4))$ and becomes smaller than the RE voltage $V_{RF}$.

A composite capacitance $C_{13}$ of one capacitance $C_1$ and one capacitance $C_3$ connected in series is expressed by the following expression (2A).

$$C_{13} = C_1 \times C_3/(C_1+C_3) = C_1/(1+C_1/C_3) \qquad \text{(expression 2A)}$$

Likewise, a composite capacitance $C_{24}$ of the capacitance $C_2$ and the capacitance $C_4$ connected in series is expressed by the following expression (2B).

$$C_{24} = C_2/(1+C_2/C_4) \qquad \text{(expression 2B)}$$

Note that since the capacitances $C_3$ and $C_4$ in expressions (1A), (1B), (2A) and (2B) are values of capacitive coupling between the movable upper capacitance/driving electrode 2 and the lower driving electrode 31, they differ, for example, between the case in which the MEMS variable capacitance device 100A is in the down-state and the case in which the device is in the up-state. Since the capacitances $C_3$ and $C_4$ are inversely proportional to the interval between the movable upper capacitance/driving electrode 2 and the lower driving electrode 31, the capacitance values of the capacitances $C_3$ and $C_4$ in the down-state are larger than those in the up-state.

When the RF power applied between the signal electrode and the ground electrode is 35 dBm (about 3.2 W), the RF voltage $V_{RF}$ is, for example, about 13 V.

As mentioned above, the RF voltage $V_{RF}$ is a potential difference between the signal electrode 11 and the ground electrode 12, and therefore electrostatic attraction caused by the RF voltage $V_{RF}$ occurs between the upper capacitance/driving electrode 2 and the lower capacitance electrodes 11 and 12.

In a conventional MEMS variable capacitance device, when the RF voltage $V_{RF}$ is output, a movable upper capacitance electrode is pulled toward a lower capacitance electrode by electrostatic attraction resulting from the RF voltage $V_{RF}$. For this reason, a driving force larger than the electrostatic attraction resulting from the RF voltage $V_{RF}$ is needed in order to pull up (pull out) the upper capacitance electrode. Consequently, it has not been possible for conventional MEMS variable capacitance devices to readily achieve hot switching.

In contrast, in the MEMS variable capacitance device 100A of this embodiment, a plurality of (four in this example) capacitances $C_1$, $C_2$, $C_3$ and $C_4$ are inserted between a signal line (signal electrode) sig and a ground line (ground electrode) gnd. These capacitances $C_1$, $C_2$, $C_3$ and $C_4$ are connected in series between the upper capacitance/driving electrode 2 and the lower capacitance electrodes 11 and 12 through the lower driving electrodes 31 and 32. The capacitances $C_1$, $C_2$, $C_3$ and $C_4$ are connected in series between the signal line sig and the ground line gnd through the upper capacitance/driving electrode 2.

Therefore, as indicated by expressions (1A) and (1B), the potential differences $\Delta V_1$ and $\Delta V_2$ between the upper capacitance/driving electrode 2 and the lower driving electrodes 31 and 32 become smaller than the RF voltage $V_{RF}$ according to the value of $C_1/(2(C_1+C_3))$, or $C_2/(2(C_2+C_4))$. Electrostatic attraction between the upper capacitance/driving electrode 2 and the lower driving electrode 31 and electrostatic attraction between the upper capacitance/driving electrode 2 and the lower driving electrode 32 are represented as a product of the capacitance $C_3$ and the potential difference $\Delta V_1$ and a product of the capacitance $C_4$ and the potential difference $\Delta V_2$, respectively. Consequently, the electrostatic attraction exerted on the upper capacitance/driving electrode 2 is small compared to the case in which the RF voltage $V_{RF}$ is directly applied between the upper capacitance/driving electrode 2 and the lower capacitance electrodes 11 and 12.

For example, in the down-state of the MEMS variable capacitance device 100A, if the magnitudes of the capacitances $C_3$ and $C_4$ are the same as those of the capacitances $C_1$ and $C_2$, respectively, the potential differences $\Delta V_1$ and $\Delta V_2$ are ¼ of the RF voltage $V_{RF}$ on the basis of expressions (1A) and (1B), respectively. In this case, assuming that the applied RF voltage $V_{RF}$ is about 13 V, the potential differences $\Delta V_1$ and $\Delta V_2$ are each about 3 V. The pull-out voltage for returning the upper capacitance/driving electrode 2 to the up-state is, for example, about 5 V.

If the potential differences $\Delta V_1$ and $\Delta V_2$ of about 3 V can be obtained as mentioned above in this way, it is easy to return the movable upper capacitance/driving electrode 2 from the down-state to the up-state even during the application of RE power. Accordingly, the MEMS variable capacitance device 100A of this embodiment allows hot switching to be readily achieved and improves the hot switching properties.

The MEMS variable capacitance device 100A having a structure in which the lower driving electrodes 31 and 32 are stacked above the lower capacitance electrodes 11 and 12 (hereinafter referred to as a "stacked electrode structure") as in this embodiment can suppress variations in its capacitance value.

In a usual electrostatic actuator for use in the MEMS variable capacitance device, one of an upper driving electrode and a lower driving electrode is movable, and the other is fixed onto the substrate. During the down-state of the usual electrostatic actuator, the value of the capacitance between the upper driving electrode and the lower driving electrode is affected by the roughness of the surfaces (surface roughness) of the driving electrodes. Variations in this capacitance value are therefore larger than those in the capacitance value of the MIM capacitance element.

In the MEMS variable capacitance device 1 having the stacked electrode structure as in this embodiment, the MIM capacitance element having the capacitances $C_1$ and $C_2$ is responsible for part of the capacitance $C_{MEMS}$ which contributes to the operation and output thereof. The MIM capacitance element is less affected by the roughness at the interface between an electrode and an insulating film, and its capacitance value has small variations. For this reason, compared to the MEMS variable capacitance device using a usual electrostatic actuator, the MEMS variable capacitance device 100A in which the MIM capacitance element directly contributes to the operation and the output as in this embodiment can reduce variations in capacitance which produces the driving force.

More specifically, in the MEMS variable capacitance device 100A of this embodiment, decreasing a capacitance ratio $C_3/C_1 (=C_4/C_2)$ allows variations in capacitance which contributes to the operation and output of the device to be reduced. For example, suppose that variations in the capacitances $C_1$ and $C_2$ of the MIM capacitance element are negligibly small. When the magnitudes of the capacitances $C_3$ and $C_4$ are the same as those of the capacitances $C_1$ and $C_2$, respectively, during the down-state, variations in capacitance are reduced by half. Accordingly, the operation of the HEMS variable capacitance device can be stabilized.

As described above, according to the MEMS device (MEMS variable capacitance device) in accordance with the first embodiment, its hot switching properties can be improved.

(c) Verification

Figure 7:
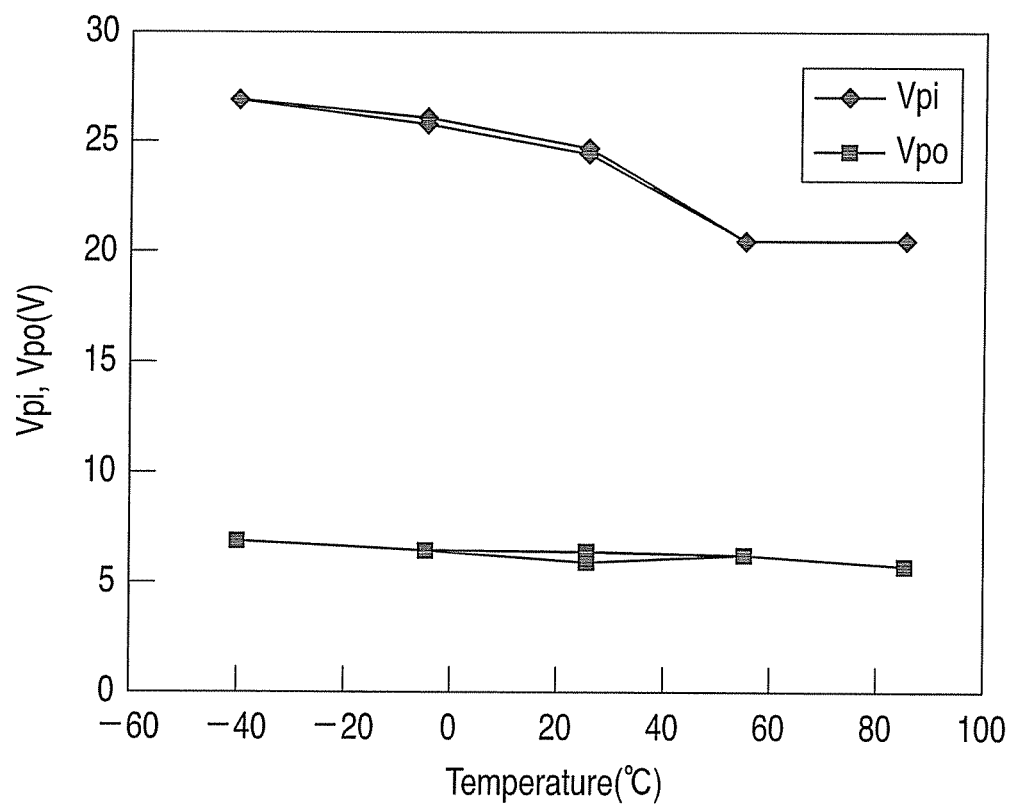

Referring to FIGS. 6A to 7, the verification result of a MEMS device according to the first embodiment is described.

First, the temperature characteristics of a pull-in voltage Vpi and a pull-out voltage Vpo of the MEMS device are described. Here, the pull-in voltage Vpi and the pull-out voltage Vpo of an electrostatically driven actuator 200 having a structure similar to that of the MEMS variable capacitance device of the first embodiment are measured. FIGS. 6A and 6B illustrate the structure of the electrostatically driven actuator 200. FIG. 6A illustrates a planar structure of the electrostatically driven actuator 200, and FIG. 6B illustrates a cross-sectional structure taken along the line A-A' of FIG. 6A.

As illustrated in FIGS. 6A and 6B, the two lower driving electrodes 31 and 32 are provided on the substrate 9. A movable upper electrode 2X is supported in midair above the lower driving electrodes 31 and 32. The actuator 200 used for verification does not include a lower capacitance electrode. The upper electrode 2X therefore functions only as a driving electrode. The upper electrode 2X as used herein is referred to as an "upper driving electrode 2X". The upper driving electrode 2X is provided with opening portions 21 which pass therethrough from the top surface toward the bottom surface.

An end of a spring structure 46 is connected to the upper driving electrode 2X. An insulating material (SiN) is used for the spring structure 46. The other end of the spring structure 46 is connected to the anchor portion 51 on the dummy layers 93 and 94.

A potential is supplied to the lower driving electrodes 31 and 32 through an interconnect 99. No potential is supplied to the upper driving electrode 2 such that the upper driving electrode 2 is in a floating state.

FIG. 7 illustrates the temperature dependency of the pull-in voltage Vpi and the pull-out voltage Vpo of the actuator 200 illustrated in FIGS. 6A and 6B. The temperature range used for the measurement is −40° C. to 85° C.

As illustrated in FIG. 7, in the above temperature range, the pull-out voltage Vpo varies within the range of about 7 to 8 V. The pull-in voltage Vpi varies within the range of about 21 to 27 V.

Note that the pull-in voltage Vpi and the pull-out voltage Vpo vary in accordance with a spring constant k of a spring structure and a facing area A of the upper driving electrode and the lower driving electrode. However, the magnitudes of the pull-in voltage Vpi and the pull-out voltage Vpo are proportional to $\sqrt{(k/A)}$. It should therefore be understood that results similar to this verification result are obtained for actuators in which the ratio k/A is constant even if their electrode sizes are different.

On the basis of the measurement result of the pull-out voltage Vpo of the actuator illustrated in FIG. 7, conditions of the capacitances $C_1$, $C_2$, $C_3$ and $C_4$ for hot switching are obtained. Here, the capacitance ratio $C_3/C_1$ of one fixed capacitance $C_1$ and one variable capacitance $C_3$ connected in series is verified. The RF power of the MEMS variable capacitance device is assumed to be 35 dBm (about 3.2 W), and the impedance between the signal line sig and the ground line gnd is assumed to be 50Ω.

When RF power of 35 dBm is applied, a potential difference (RF voltage $V_{RF}$) of about 13 V is applied between the signal line sig and the ground line gnd according to the above-mentioned impedance (50Ω). In this state, the movable upper electrode 2 may be changed from the down-state to the up-state by making the pull-out voltage Vpo larger than $\Delta V_1$ and $\Delta V_2$ in expressions (1A) and (1B), that is, establishing the relationship: Vpo>$\Delta V_1$, (or Vpo>$\Delta V_2$).

Here, from the measurement result illustrated in FIG. 7, the pull-out voltage Vpo is assumed to be 5 V as the reference value. The RF voltage $V_{RF}$ is assumed to be 13 V. By performing the operation of expression (1A) using these values Vpo and $V_{RF}$ so that the relationship Vpo>$\Delta V$ holds, the following expression (3) is obtained. Note that, here, the case in which the capacitances $C_1$ and $C_2$ have the relationship $C_1=C_2$, and the capacitances $C_3$ and $C_4$ have the relationship $C_3=C_4$ is described for the purpose of simplification.

$$(C_3/C_1)>0.5 \quad (3)$$

From this result, in order to permit hot switching in a state in which RF power of 35 dBm is applied to the MEMS variable capacitance device 100A having a stacked electrode structure, it is preferable that conditions of expression (3) be satisfied. It is preferable that a capacitance ratio $C_4/C_2$ of the fixed capacitance $C_2$ and the variable capacitance $C_4$ connected in series satisfy $(C_4/C_2)>0.5$. Note that at least one of the capacitance ratio $C_3/C_1$ and the capacitance ratio $C_4/C_2$ may be larger than 0.5. Note that the capacitance ratio $C_3/C_1$ and the capacitance ratio $C_4/C_2$ may be 0.5.

As described above, the MEMS device (MEMS variable capacitance device) has a configuration as illustrated in FIGS. 1 to 4, and the capacitances $C_1$ and $C_2$ between the lower electrode 1 and the driving electrode 2 and the capacitances $C_3$ and $C_4$ between the upper electrode and the driving electrode have the relationships of expressions (1A) and (1B) and further have the relationship of expression (3), and thus the hot switching properties improve.

Accordingly, the first embodiment can achieve a MEMS device with the improved hot switching properties.

(d) Manufacturing Method

Figure 8A:
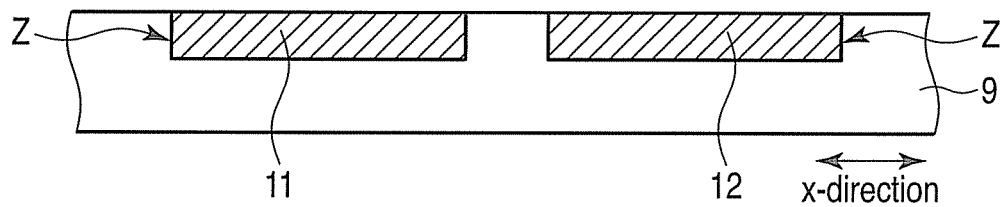
FIGS. 8A, 8B and 8C illustrate a method of manufacturing a MEMS device.
Figure 8B:
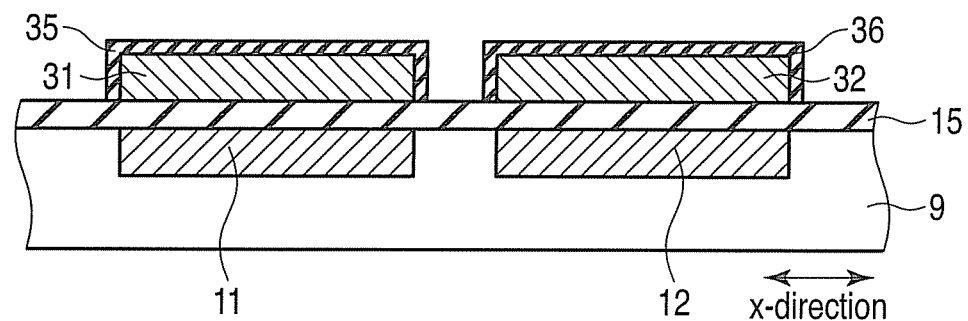
Figure 8C:
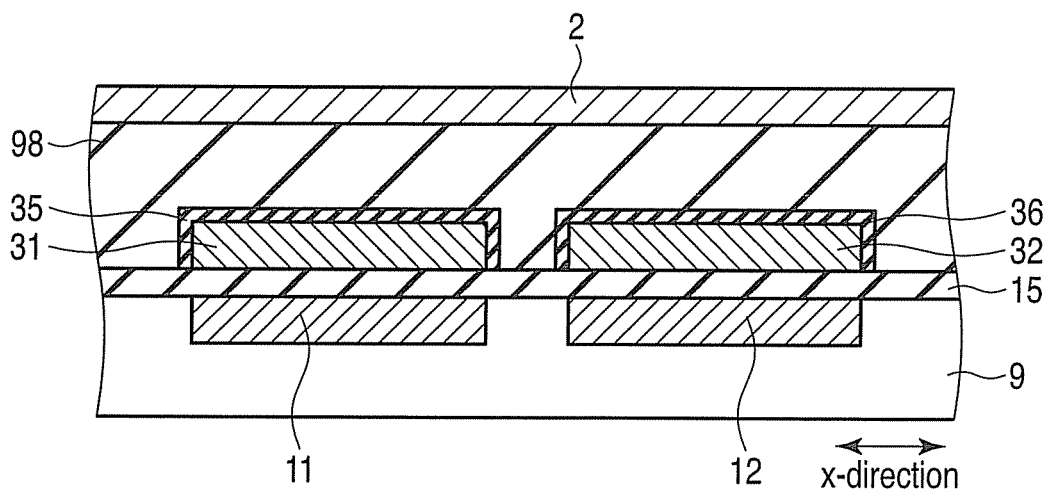

Referring to FIGS. 8A to 8C, a method of manufacturing a MEMS device (MEMS variable capacitance device) according to the first embodiment is described below. Here, a region in which lower capacitance electrodes and lower driving electrodes of a MEMS variable capacitance device are formed is extracted, and processes of manufacturing the MEMS variable capacitance device are described. FIGS. 8A to 8C illustrate cross-sectional structures along the y-direction of FIG. 1 in the respective processes of manufacturing the MEMS variable capacitance device.

First, as illustrated in FIG. 8A, the grooves Z are formed in the substrate (e.g., interlayer insulating film) 9 using, for example, a photolithography technique and a reactive ion etching (RIE) method.

Thereafter, a conductor is deposited on the substrate 9 and in the grooves Z using, for example, a CVD (chemical vapor deposition) method or a sputtering method. For example, metals, such as aluminum (Al), copper (Cu) and gold (Au), and alloys of any one of these metals are used for the conductor.

Then, using the top surface of the substrate 9 as a stopper, planarization processing of the conductor is performed by a CMP (chemical mechanical polishing) method.

Thus, the lower capacitance electrodes 11 and 12 of the MEMS variable capacitance device are buried in the grooves Z of the substrate 9 in a self-aligned manner. In the MEMS variable capacitance device of this embodiment, the lower capacitance electrodes 11 and 12 are formed such that two electrodes (interconnects) are paired. Specifically, a pair of lower capacitance electrodes is formed of the signal electrode 11 and the ground electrode 12. A potential difference between the signal line 11 and the ground line 12 is output (RF power, RF voltage) of the MEMS variable capacitance device.

As such, the lower capacitance electrodes 11 and 12 are formed by a damascene process. Note that the grooves Z are formed so that their planar shapes are given shapes in accordance with the layout of the lower capacitance electrodes 11 and 12.

Next, as illustrated in FIG. 8B, the insulating film 15 is deposited on the surface of the substrate 9 and on the lower capacitance electrodes 11 and 12 using, for example, a CVD method or a thermal oxidation method. For example, silicon oxide is used for the insulating film 15. However, materials, such as silicon nitride, aluminum oxide and aluminum nitride, which have higher relative permittivities than silicon oxide may be used.

Subsequently, a conductor is deposited on the insulating film 15, for example, by a CVD method or a sputtering method. The deposited conductor is processed into a given shape by a photolithography technique and an RIE method. Thus, the lower driving electrodes 31 and 32 of the MEMS variable capacitance device are formed at positions where they vertically overlap above the signal electrode 11 and the ground electrode 12, respectively.

As such, the lower driving electrodes 31 and 32 are stacked above the signal electrode 11 and the ground electrode 12. As a result, one MIM capacitance element is formed of the signal electrode 11, the lower driving electrode 31, and the insulating film 15 sandwiched by the two electrodes 11 and 31. Likewise, another MIM capacitance element is formed of the ground electrode 12, the lower driving electrode 32, and the insulating film 15 sandwiched by the two electrodes 12 and 32. These MIM capacitance elements have capacitances $C_1$ and $C_2$ according to the facing areas of the stacked electrodes, the thickness of the insulating film, and the dielectric constant of the insulating film.

Here, as illustrated in FIG. 8A, the signal/ground electrodes 11 and 12 are formed using the damascene process. This causes the top surfaces of the signal/ground electrodes 11 and 12 and the top surface of the insulating film 15 deposited on the electrodes 11 and 12 to be planar. Therefore, the top surfaces and the bottom surfaces of the lower driving electrodes 31 and 32 formed on the planar insulating film 15 are also planar. Accordingly, variations of the capacitances $C_1$ and $C_2$ of the MIM capacitance elements become smaller.

Note that, simultaneously with the formation of the lower driving electrodes 31 and 32, interconnects and dummy layers of the MEMS device may be formed on the insulating film 15 (substrate 9) using the same material as that of the lower driving electrodes 31 and 32.

The insulating films 35 and 36 are formed on the lower driving electrodes 31 and 32 using, for example, a CVD method or a thermal oxidation method. For example, silicon oxide is used for the insulating films 35 and 36. However, an insulator having a higher relative permittivity than silicon oxide may be used for the insulating films 35 and 36. Note that when the insulating films 35 and 36 are deposited using a CVD method, they are deposited not only on the surfaces of the lower driving electrodes 31 and 32 but also on the insulating film 15; however, illustration here is omitted.

Subsequently, as illustrated in FIG. 8C, a sacrificial layer 98 is formed on the insulating films 15 and 35 using, for example, a CVD method or a coating method. Any of insulators, conductors (metal), semiconductors and organic matters (e.g., resist) may be used for the sacrificial layer 98 as long as it can secure a given etching selectivity to a material formed in a lower layer than the sacrificial layer 98 and a material, which will be described later, to be formed in an upper layer than the sacrificial layer 98.

In a region in which an anchor portion is formed (hereinafter referred to as an "anchor forming region"), an opening portion (not illustrated) in which an anchor portion is buried is formed in the sacrificial layer 98 using a photolithography technique and an RIE method.

Then, a conductor 2 is deposited on the sacrificial layer 98 using, for example, a CVD method or a sputtering method.

The conductor 2 on the sacrificial layer 98 is processed into a given shape using, for example, a photolithography technique and an RIE method. Thereby, the upper capacitance electrode 2 of the MEMS variable capacitance device is formed. Note that, in the MEMS variable capacitance device according to the first embodiment, the upper electrode 2 functions as a capacitance electrode of a variable capacitance element and also functions as a driving electrode of an actuator.

Using the same material (conductor) as the upper capacitance/driving electrode 2, a first spring structure (not illustrated) is formed. The spring structure is integrally tied to the upper capacitance/driving electrode 2. In this case, the spring structure is formed of, for example, a ductile material.

At the same time as the conductor 2 is deposited on the sacrificial layer 98, the conductor 2 is buried in the opening portion of the anchor forming region. Thereby, an anchor portion (not illustrated) is formed at a given position on the substrate. The anchor portion, however, may be formed in a process different from those of the upper electrode and the spring structure.

In cases where the MEMS variable capacitance device includes the spring structures 41 and 45 of materials which are different from each other as illustrated in FIGS. 1 to 2B, after the upper capacitance/driving electrode 2 and the first spring structure 41 are formed, a second spring structure (not illustrated) is formed on the sacrificial layer 98 so as to be connected at a given position on the upper capacitance/driving electrode 2. For example, the second spring structure is formed through the following processes.

After the upper capacitance/driving electrode 2 and the first spring structure are formed, an opening portion is formed in the sacrificial layer 98 in a region for forming an anchor portion with which the second spring structure is to be connected. A material of forming the second spring structure (e.g., brittle material) is deposited on the upper capacitance/driving electrode 2, on the sacrificial layer 98, and in the opening portion of the anchor forming region using, for example, a CVD method and the like. The deposited member is processed into a given shape by, for example, a photolithography technique and an RIE method, thereby forming the second spring structure. The material deposited in the opening portion of the anchor forming region becomes an anchor portion (not illustrated). Note that the anchor portion connected with the second spring structure may be formed of the same material (e.g., ductile material) in the same processes as the anchor portion connected with the first spring structure.

Thereafter, the sacrificial layer 98 is selectively removed using, for example, wet etching. Thereby, as illustrated in FIG. 2A, a cavity is formed between the upper capacitance/driving electrode 2 and the lower driving electrodes 31 and 32. The capacitive coupling $C_3$ and $C_4$ is formed between the upper capacitance/driving electrode 2 and the lower driving electrodes 31 and 32.

Through the above-described processes, for example, a MEMS variable capacitance device of a stacked electrode structure is completed as illustrated in FIGS. 1 to 2B.

Note that a low pass filter connecting to an upper capacitance/driving electrode and a lower driving electrode may be formed at the same interconnect level as the MEMS variable capacitance device, and may also be formed at an interconnect level in a lower layer than the MEMS variable capacitance device (e.g., on the silicon substrate).

As described above, the MIM capacitance element (fixed capacitance element) on the substrate is responsible for part of the capacitance which contributes to the operation and output of the MEMS variable capacitance device according to the first embodiment. Therefore, in order to decrease variations in capacitance value which contributes to the operation and the output, it is desirable that variations of the MIM capacitance element be suppressed.

As mentioned above, the MIM capacitance elements are formed of the lower capacitance electrodes 11 and 12 and the lower driving electrodes 31 and 32. Consequently, as in the manufacturing method which has been described referring to FIGS. 8A to 8C, forming the lower capacitance electrodes 11 and 12 using a damascene process results in the improved planarization of the top surfaces of the lower capacitance electrodes 11 and 12 and the insulating film 15 on the electrodes 11 and 12. It should be understood that, in the lower driving electrodes stacked on the insulating film 15, their bottom surfaces have improved planarization. Thereby, variations in capacitance of the MIM capacitance element included in the MEMS device decrease.

In this way, variations in the capacitances $C_1$ and $C_2$ of the MIM capacitance element which contributes to the operation and the output are reduced, and therefore the operation of the MEMS variable capacitance device can be stabilized.

In this embodiment, the constant capacitances $C_1$ and $C_2$ between the lower capacitance electrodes 11 and 12 and the lower driving electrodes 31 and 32 and the variable capacitances $C_3$ and $C_4$ between the lower driving electrodes 31 and 32 and the upper capacitance/driving electrode 2 enable the hot switching properties of the MEMS variable capacitance device to be improved.

Therefore, according to a method of manufacturing the MEMS device in accordance with the first embodiment, it is possible to provide a MEMS device which readily achieves hot switching.

(2) Second Embodiment

Figure 9:
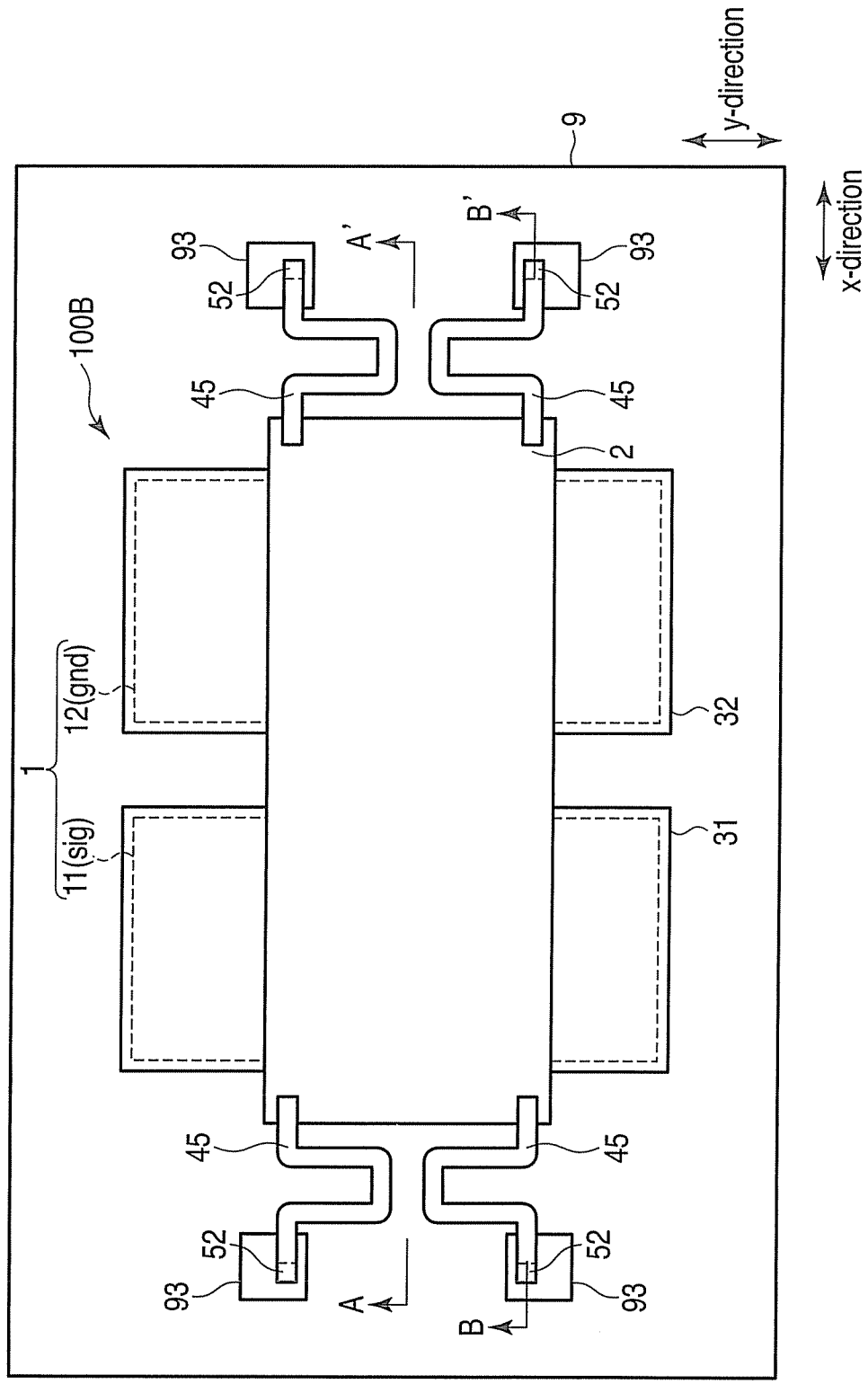
FIG. 9 is a plan view illustrating the structure of a MEMS device according to a second embodiment.
Figure 10A:
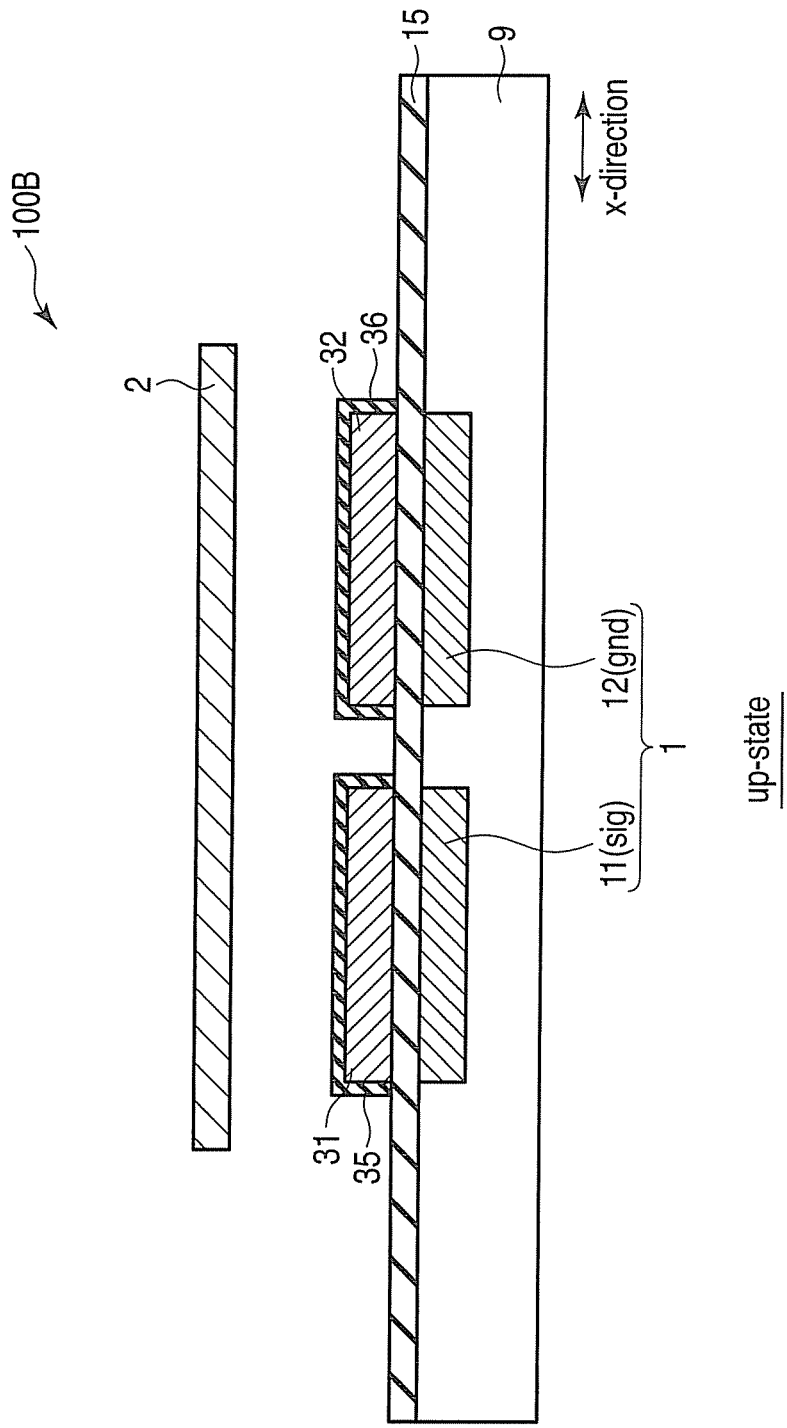
FIG. 10A is a cross-sectional view illustrating the structure of the MEMS device according to the second embodiment.

Referring to FIGS. 9, 10A and 10B, the structure of a MEMS device according to a second embodiment is described. FIG. 9 is a plan view illustrating a planar structure of the MEMS device (e.g., MEMS variable capacitance device) in this embodiment. FIG. 10A is a cross-sectional view illustrating a cross-sectional structure taken along the line A-A' of FIG. 9. The cross-sectional structure taken along the line B-B' in FIG. 9 is substantially the same as the structure shown in FIG. 2B. FIG. 10B shows the state of the MEMS variable capacitance device of this embodiment when it is driven.

Here, differences between the MEMS device according to the second embodiment and the MEMS device according to the first embodiment are mainly described.

In a MEMS variable capacitance device 100B according to the second embodiment, no potential is supplied to the upper capacitance/driving electrode 2.

For example, as illustrated in FIGS. 9 to 10B, the upper capacitance/driving electrode 2 is supported in midair by the spring structures 45 and the anchor portions 52. The spring structures 45 are electrically isolated from the outside. Alternatively, a material used for the spring structures 45 is an insulator. Therefore, through the spring structures 45, a potential is not supplied to the upper capacitance/driving electrode 2 from the outside. In the MEMS variable capacitance device 100B of this embodiment, a spring structure electrically made of a conductor and connected to the outside is not provided. Therefore, through the spring structures, no potential is supplied to the upper capacitance/driving electrode 2.

In this manner, in the MEMS variable capacitance device 100B according to the second embodiment, no potential is supplied to the upper capacitance/driving electrode 2 from the outside, so that the upper capacitance/driving electrode 2 is electrically in a floating state.

In the MEMS variable capacitance device 100B illustrated in FIGS. 9, 10A and 10B, a potential is not directly supplied to the upper capacitance/driving electrode 2. However, providing a potential difference between the first lower driving electrode 31 and the second lower driving electrode 32 causes the upper capacitance/driving electrode 2 to move in a vertical direction (perpendicular direction) with respect to the lower driving electrodes 31 and 32. For example, as illustrated in FIG. 10B, when the upper capacitance/driving electrode 2 is pulled down toward the lower driving electrodes 31 and 32, the bias potential Vb is supplied to the first lower driving electrode 31, and the ground potential Vgnd is supplied to the second lower driving electrode 32.

The reason why the upper capacitance/driving electrode 2 to which a potential is not supplied moves toward the lower driving electrodes 31 and 32 is as follows.

The internal potential of the upper capacitance/driving electrode 2 in a floating state is dependent on a capacitance (capacitive coupling) between the upper capacitance/driving electrode 2 and the lower driving electrodes 31 and 32.

When a potential difference is provided between the two lower driving electrodes 31 and 32, there arises a difference between the amount of electrical charge (potential) held by one capacitance, the capacitance $C_3$, and the amount of electrical charge held by the other capacitance, the capacitance $C_4$. As a result, the internal potential of the upper capacitance/driving electrode 2 varies. This variation in internal potential cause a potential difference to be provided between the upper capacitance/driving electrode 2 and the two lower driving electrodes 31 and 32, which results in occurrence of electrostatic attraction.

Thereby, the movable upper capacitance/driving electrode 2 as illustrated in FIG. 10B moves vertically with respect to the lower driving electrodes 31 and 32. Note that when the upper capacitance/driving electrode 2 is pulled upward, for example, the potentials of the two lower driving electrodes 31 and 32 are made the same.

As described above, even when no potential is supplied to the upper capacitance/driving electrode 2, the MEMS variable capacitance device 100B of this embodiment is driven utilizing the capacitive coupling $C_3$ and $C_4$ of the lower driving electrodes 31 and 32 and the upper capacitance/driving electrode 2 in the floating state.

In the MEMS variable capacitance device 100B of this embodiment, as in the first embodiment, the constant capacitances $C_1$ and $C_2$ and the variable capacitances $C_3$ and $C_4$ are connected in series between the upper capacitance/driving electrode 2 and the lower capacitance electrodes 11 and 12 through the lower driving electrodes 31 and 32. Further, these capacitances $C_1$, $C_2$, $C_3$ and $C_4$ are connected in series between the signal line sig and the ground line gnd. The capacitances $C_1$, $C_2$, $C_3$ and $C_4$ connected in series are a variable capacitance which generates output of the MEMS device.

Consequently, the MEMS variable capacitance device 100B in this embodiment can improve the hot switching properties, as in the first embodiment.

Therefore, according to the second embodiment, it is possible to achieve the MEMS device with the improved hot switching properties.

(3) Third Embodiment

Figure 11:
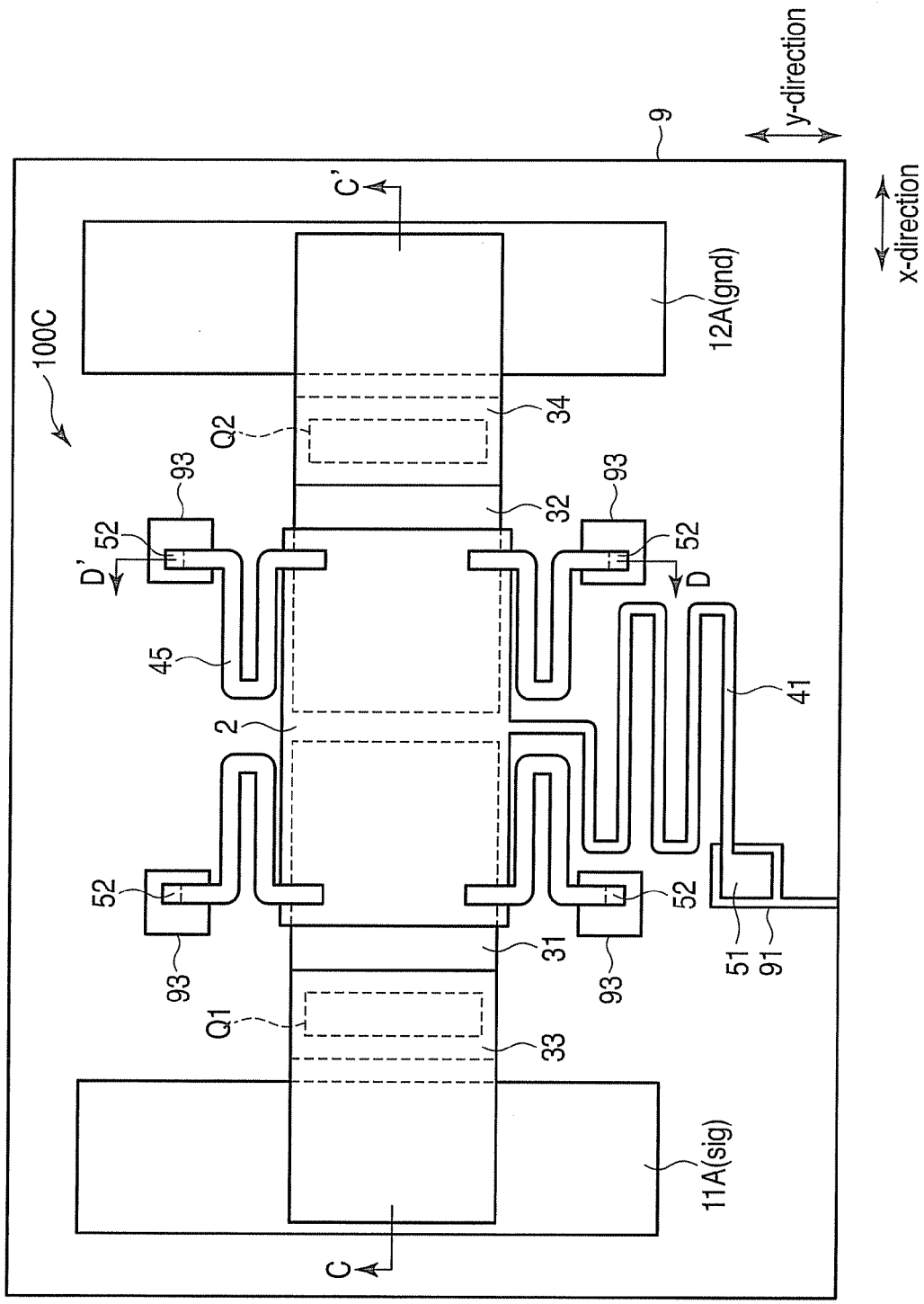
FIG. 11 is a plan view illustrating the structure of a MEMS device according to a third embodiment.
Figure 12C:
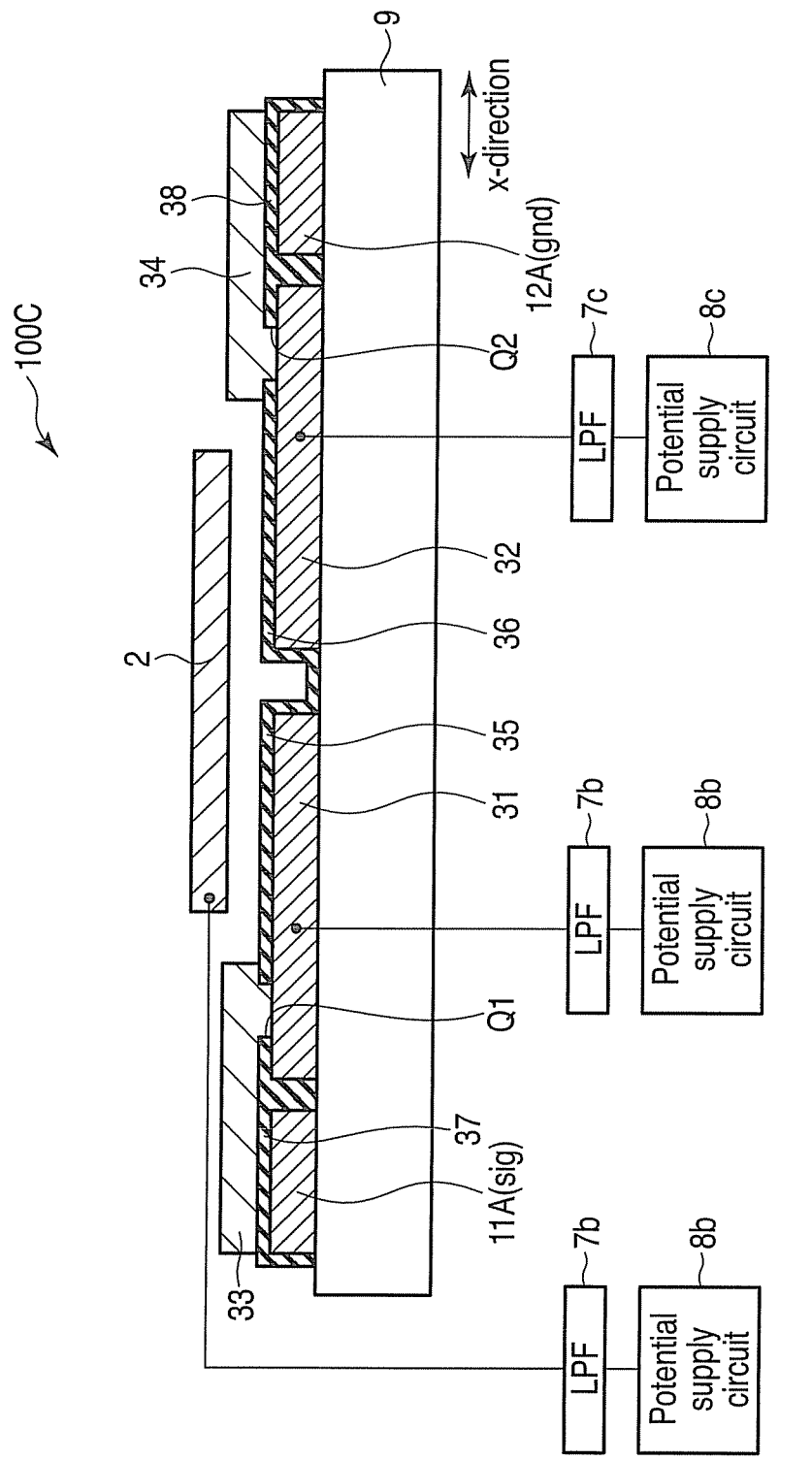
FIG. 12C illustrates the operation of the MEMS device according to the third embodiment.

Referring to FIGS. 11, 12A, 12B and 12C, the structure of a MEMS device (e.g., MEMS variable capacitance device) 100C according to a third embodiment is described. FIG. 11 is a plan view illustrating a planar structure of the MEMS variable capacitance device in this embodiment. FIG. 12A is a cross-sectional view illustrating a cross-sectional structure taken along the line C-C' of FIG. 11. FIG. 12B is a cross-sectional view illustrating a cross-sectional structure taken along the line D-D' of FIG. 11. FIG. 12C illustrates a driving state of the MEMS variable capacitance device of this embodiment.

Differences between the MEMS device according to the third embodiment and the MEMS devices according to the first and second embodiments are mainly described here.

As illustrated in FIGS. 11, 12A and 12B, unlike the first and second embodiments, the lower driving electrodes 31 and 32 are not stacked above lower capacitance electrodes 11A and 12A in the MEMS variable capacitance device 100C of this embodiment. However, the MEMS variable capacitance device 100C of this embodiment has a structure which is equivalent in terms of circuitry to the structure (stacked electrode structure) of the MEMS variable capacitance device in which lower driving electrodes are stacked above lower capacitance electrodes.

As illustrated in FIGS. 11 to 12B, the lower capacitance electrodes 11A and 12A are provided on the substrate 9. In this embodiment, the lower capacitance electrodes 11A and 12A are formed of a signal electrode 11A and a ground electrode 12A which are paired. The signal electrode 11A and the ground electrode 12A extend in the y-direction. The signal electrode 11A functions as the signal line sig, and the ground electrode 12A functions as the ground line gnd. The potential of the signal electrode 11A is variable and varies with the operation of the upper capacitance/driving electrode 2. Supplied to the ground electrode 12A is, for example, a ground potential. The potential difference (RF voltage) between the signal electrode 11A and the ground electrode 12A is output (RF power) of the MEMS variable capacitance device 100C.

The two lower driving electrodes 31 and 32 are adjacent to each other in the x-direction. The first lower driving electrode 31 is adjacent to the signal electrode 11A in a parallel direction (the x-direction) to the substrate surface. The second lower driving electrode 32 is adjacent to the ground electrode 12A in a parallel direction (the x-direction) to the substrate surface. For example, the two lower driving electrodes 31 and 32 are provided on the substrate 9 between the signal electrode 11A and the ground electrode 12A.

The lower driving electrodes 31 and 32 are provided below the upper capacitance/driving electrode 2 in a perpendicular direction to the surface of the substrate 9, and part of the two lower driving electrodes 31 and 32 is disposed at a position where the part of them vertically overlaps the upper capacitance/driving electrode 2.

The signal electrode 11A and the ground electrode 12A are disposed, for example, at positions where they do not vertically overlap the upper capacitance/driving electrode 2 in a perpendicular direction to the surface of the substrate 9.

Note that the signal/ground electrodes 11A and 12A are formed, for example, at the same time and using the same material as the lower driving electrodes 31 and 32. In this case, the film thicknesses of the signal/ground electrodes 11A and 12A are substantially the same as those of the lower driving electrodes 31 and 32.

The surfaces of the lower driving electrodes 31 and 32 are covered with the insulating films 35 and 36, respectively. The insulating films 35 and 36 are provided with opening portions Q1 and Q2, respectively. The opening portions Q1 and Q2 are provided, for example, at positions where they do not vertically overlap the upper capacitance/driving electrode 2 in a perpendicular direction to the surface of the substrate 9. The surfaces of the signal electrode 11A and the ground electrode 12A are covered with insulating films 37 and 38, respectively. The insulating films 37 and 38 are formed, for example, at the same time and using the same material as the insulating films 35 and 36. In this case, the film thicknesses of the insulating films 37 and 38 are the same as those of the insulating films 35 and 36.

As such, in the MEMS variable capacitance device 100C of this embodiment, the signal electrode 11A and the ground electrode 12A are provided at the same interconnect level as the lower driving electrodes 31 and 32. Note that the term "interconnect level" refers to the height (position) on the basis of the surface of the substrate 9 or the surface of a silicon substrate underlying the substrate 9.

First and second conductive layers 33 and 34 are provided on the insulating films 35, 36, 37 and 38.

The first conductive layer 33 is stacked above the signal electrode 11A with the insulating film 37 interposed therebetween. The first conductive layer 33 is brought into direct contact with the lower driving electrode 31 through the opening portion Q1.

The second conductive layer 34 is stacked above the ground electrode 12A with the insulating film 38 interposed therebetween. The second conductive layer 34 is brought into direct contact with the lower driving electrode 32 through the opening portion Q2. Note that the conductive layers 33 and 34 are disposed, for example, at positions where they do not vertically overlap the upper capacitance/driving electrode 2 in a perpendicular direction to the surface of the substrate.

In the MEMS variable capacitance device 100C of this embodiment, a MIM capacitance element is formed using the signal electrode 11A, the first conductive layer 33, and the insulating film 37 sandwiched between the signal electrode 11A and the conductive layer 33. According to the facing area of the electrode 11A and the conductive layer 33, the thickness of the insulating film 37, and the dielectric constant of the insulating film 37, the MIM capacitance element has the constant capacitances $C_1$. Likewise, the ground electrode 12A, the second conductive layer 34 and the insulating film 38 are included in a MIM capacitance element; the element has the constant capacitances $C_2$. In this manner, the conductive layers 33 and 34 function as electrodes of the MIM capacitance elements.

Like the first embodiment, the upper capacitance/driving electrode 2 is connected via the spring structures 41 and 45 to the anchor portions 51 and 52. The upper capacitance/driving electrode 2 is supported in midair above the lower driving electrodes 31 and 32 by the anchor portions 51 and 52. A potential is supplied to the upper capacitance/driving electrode 2 through the spring structure 41 and anchor portion 51 for which conductors (ductile materials) are used. In this embodiment, the spring structures 41 and 45 and the anchor portions 51 and 52 are provided in ends in the y-direction of the upper capacitance/driving electrode 2. Note that, like the MEMS device of the second embodiment, a potential may not be supplied to the upper capacitance/driving electrode 2, so that the upper capacitance/driving electrode 2 is in a floating state.

The MEMS variable capacitance device 100C has capacitive coupling between the upper capacitance/driving electrode 2 and the lower driving electrode 31. The MEMS variable capacitance device 100C also has capacitive coupling between the upper capacitance/driving electrode 2 and the lower driving electrode 32. The magnitudes of the capacitive coupling are the capacitances $C_3$ and $C_4$. The magnitudes of the capacitances $C_3$ and $C_4$ vary as the upper capacitance/driving electrode 2 vertically moves.

As mentioned above, the lower driving electrodes 31 and 32 are electrically connected through the opening portions Q1 and Q2 to the conductive layers 33 and 34, respectively. Thus, the MEMS variable capacitance device 1000 of this embodiment has a configuration in which the capacitances (capacitive coupling) $C_3$, $C_4$ are connected in series to the capacitances $C_1$ and $C_2$ by the opening portions Q1 and Q2 and the conductive layers 33 and 34.

In the MEMS variable capacitance device 100C of this embodiment, when a potential difference equal to or larger than the pull-in voltage is applied between the upper capacitance/driving electrode 2 and the lower driving electrodes 31 and 32, the upper capacitance/driving electrode 2 is lowered toward the lower driving electrodes 31 and 32 as illustrated in FIG. 12C. As such, the MEMS variable capacitance device 100C changes from the up-state to the down-state.

The upper capacitance/driving electrode 2 moves vertically with respect to the lower driving electrodes 31 and 32, which varies the magnitudes of the variable capacitances $C_3$ and $C_4$ between the signal electrode 11A and the upper capacitance/driving electrode 2. With this variation, the potential of the signal electrode 11A varies, so that the potential difference between the signal electrode 11A and the ground electrode 12A is output as the RF voltage $V_{RF}$.

The MEMS variable capacitance device 100C of this embodiment not only varies the inter-electrode distance between the movable upper capacitance electrode 2 and the lower capacitance electrode 11A to vary the potential of the lower capacitance electrode (signal electrode) 11A but also utilizes the fact that one MIM capacitance element (capacitance $C_1$, $C_2$) and one capacitive coupling (capacitance $C_3$, $C_4$) are connected in series between the upper capacitance electrode 2 and each of the lower capacitance electrode 11A and 12A.

When the movable upper electrode 2 changes from the up-state to the down-state, the magnitudes of the capacitances $C_3$ and $C_4$ of the capacitive coupling vary. With the variations of the capacitances $C_3$ and $C_4$, the potentials of the MIM capacitance elements having the constant capacitances $C_1$ and $C_2$ vary. As a result, the potential of the signal electrode 11A, which is an electrode of one of the MIM capacitance elements, varies. Note that the potential of the ground electrode 12A is fixed to the ground potential and therefore does not vary even when the upper electrode 2 vertically moves.

Thus, even when the lower capacitance electrode 11A is disposed at a position where it does not vertically overlap the upper capacitance electrode 2, the potential of the lower capacitance electrode 11A varies.

In the MEMS variable capacitance device 100C of this embodiment, the constant capacitances $C_1$ and $C_2$ and the variable capacitances $C_3$ and $C_4$ between electrodes are connected in series between the upper capacitance/driving electrode 2 and the lower capacitance electrodes 11A and 12B through the lower driving electrodes 31 and 32. These capacitances $C_1$, $C_2$, $C_3$ and $C_4$ are connected in series between the signal electrode 11A and the ground electrode 12A. The capacitances $C_1$, $C_2$, $C_3$ and $C_4$ connected in series are the variable capacitance of the device, and output is generated by using the capacitances (composite capacitance) $C_1$, $C_2$, $C_3$ and $C_4$ connected in series.

Therefore, when the lower driving electrodes 31 and 32 are not stacked above the signal electrode 11 and the ground electrode 12, as in the MEMS variable capacitance device 100C of the third embodiment, the equivalent configuration to those of the MEMS variable capacitance devices described in the first and second embodiments can be formed. Thus, the MEMS variable capacitance device 100C of this embodiment can improve the hot switching properties.

In a method of manufacturing the MEMS variable capacitance device according to this embodiment, the signal electrode 11A and the ground electrode 12A are formed at the same time and in the same process as the lower driving electrodes 31 and 32. That is, the MEMS variable capacitance device 100C of this embodiment can be formed in a simple process without the use of a damascene process.

In this embodiment, since the signal/ground electrodes 11A and 12A are formed at the same interconnect level (interconnect layer) as the lower driving electrodes 31 and 32, the substantial number of interconnect levels for forming the MEMS variable capacitance device 100C is two even though the conductive layers 33 and 34 are newly provided.

Thus, the MEMS variable capacitance device 100C of this embodiment enables the number of interconnect levels to be reduced compared to a MEMS variable capacitance device of a stacked electrode structure. Therefore, according to the MEMS variable capacitance device 100C of this embodiment, manufacturing cost can be reduced.

Therefore, according to the third embodiment, the MEMS variable capacitance device with the improved hot switching properties can be achieved. Further, according to this embodiment, contributions to simplification of a method of manufacturing a MEMS variable capacitance device and reduction in manufacturing cost can be made.

(4) Fourth Embodiment

Figure 13:
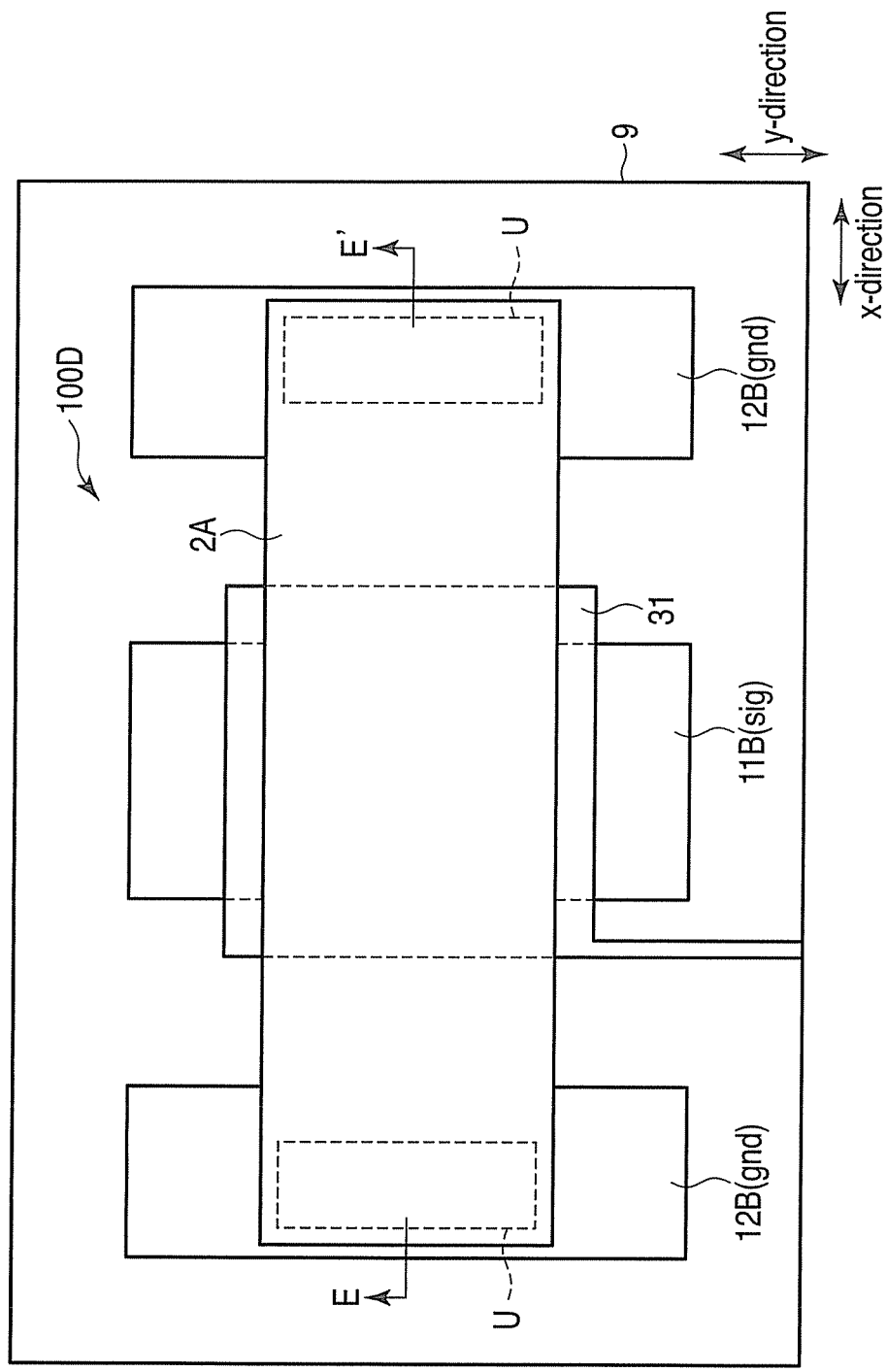
FIG. 13 is a plan view illustrating the structure of a MEMS device according to a fourth embodiment.
Figure 14A:
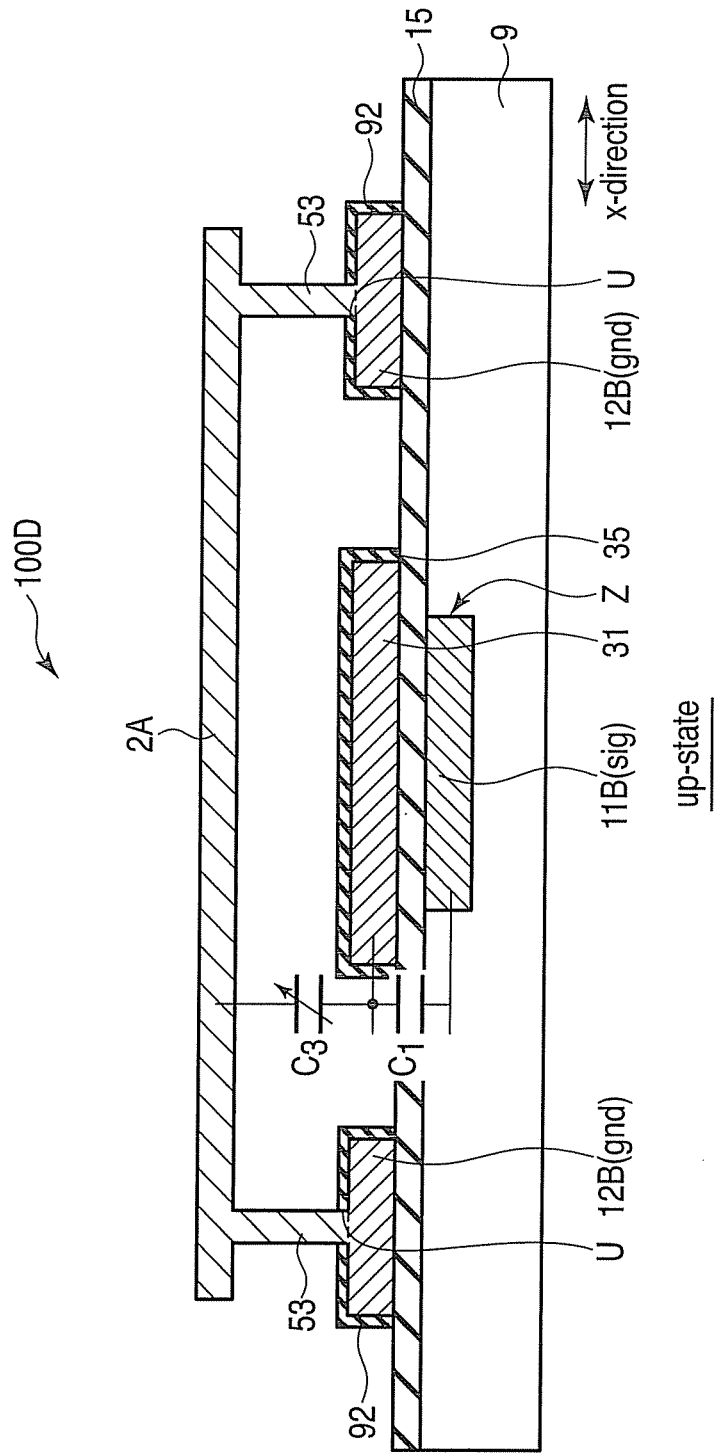

Referring to FIGS. 13, 14A and 14B, the structure of a MEMS device (MEMS variable capacitance device) according to a fourth embodiment is described. FIG. 13 is a plan view illustrating a planar structure of a MEMS variable capacitance device 100D according to this embodiment. FIG. 14A is a cross-sectional view illustrating a cross-sectional structure taken along the line E-E' of FIG. 13. FIG. 14B illustrates a driving state of the MEMS variable capacitance device of this embodiment.

Differences between the MEMS variable capacitance device according to the fourth embodiment and the MEMS variable capacitance devices according to the first to third embodiments are mainly described here.

The MEMS variable capacitance device of this embodiment differs from the MEMS variable capacitance devices of other embodiments in that a movable upper electrode 2A is connected to ground lines gnd (ground electrodes 12B).

As illustrated in FIGS. 13 and 14A, the MEMS variable capacitance device 100D of this embodiment has a signal electrode 11B and the ground electrodes 12B. The signal electrode 11B and the ground electrodes 12B are paired as lower capacitance electrodes.

The signal electrode 11B is, for example, buried within the grooves Z in the substrate 9 using a damascene process and extends in the y-direction. The signal electrode 11B functions as the signal line sig. The potential of the signal electrode 11B varies with the operation of the upper capacitance/driving electrode 2A.

In this embodiment, two ground electrodes 12B are provided adjacent to each other in the x-direction on the substrate 9. The two ground electrodes 12B each extend in the y-direction. Note that the two ground electrodes 12B may be electrically connected. The two ground electrodes 12B function as the ground lines gnd, and ground potentials are supplied to them.

The potential difference between the signal electrode 11B and the ground electrodes 12B are output (RF power/RF voltage) from the MEMS variable capacitance device 100D.

The surfaces of the ground electrodes 12B are covered with the insulating films 92. Opening portions U are provided in the insulating films 92. An anchor portion 53 is provided on each of the two ground electrodes 12B. The anchor portion 53 is brought into direct contact with the top surface of the ground electrode 12B through the opening portion U. For example, a conductor is used for the anchor portion 53.

The MEMS variable capacitance device 100D of this embodiment has one lower driving electrode 31. The lower driving electrode 31 is disposed on the substrate 9 (the insulating film 15) between the two ground electrodes 12B. The lower driving electrode 31 is stacked above the signal electrode 11B with the insulating film 15 interposed therebetween. The dimensions (width and length) of the lower driving electrode 31 may be different from or the same as those of the signal electrode 11B.

The surface of the lower driving electrode 31 is covered with the insulating film 35.

The lower driving electrode 31 is formed, for example, at the same time and using the same material as the ground electrode 12B. In this case, the film thickness of the lower driving electrode 31 is the same as that of the ground electrode 12B. The insulating film 35 is formed, for example, at the same time and using the same material as the insulating film 92. In this case, the film thickness of the insulating film 35 is the same as that of the insulating film 92.

The upper capacitance/driving electrode 2A is provided above the lower driving electrode 31. The upper capacitance/driving electrode 2A has, for example, a rectangular plane shape and extends in the y-direction. The anchor portions 53 are connected to both ends in the y-direction of the upper capacitance/driving electrode 2A. The upper capacitance/driving electrode 2A is supported in midair by the anchor portions 53, and a cavity is provided between the upper capacitance/driving electrode 2A and the lower driving electrode 31. In this embodiment, no spring structure is used, and the upper capacitance/driving electrode 2A is directly connected to the anchor portions 53.

The upper capacitance/driving electrode 2A and the lower capacitance electrode (signal electrode 11B) form a pair of capacitance electrodes; the upper capacitance/driving electrode 2A and the lower driving electrode 31 form a pair of driving electrodes.

In the MEMS variable capacitance device 100D of this embodiment, the signal electrode 11B and the lower driving electrode 31 form a MIM capacitance element. The MIM capacitance element has the capacitance $C_1$. The upper capacitance/driving electrode 2A and the lower driving electrode 31 form capacitive coupling. This capacitive coupling has the capacitance $C_3$. The capacitances $C_1$ and $C_3$ are connected in series between the signal electrode 11B and the ground electrodes 12B.

In this embodiment, the upper capacitance/driving electrode 2A is electrically connected to the ground electrodes 12B by the anchor portions 53. Thereby, in the MEMS variable capacitance device 100D of this embodiment, a ground potential is supplied to the upper capacitance/driving electrode 2A, and the potential of the upper capacitance/driving electrode 2A becomes the same as the potential of the ground electrode 12B. Note that if the upper capacitance/driving electrode 2A is electrically connected to the ground electrodes 12B, the anchor portions 53 may not be provided on the ground electrodes 12B.

FIG. 14B illustrates the down-state of the MEMS variable capacitance device 100D of this embodiment.

In this embodiment, since the upper capacitance/driving electrode 2A is connected to the ground electrodes 12B, the potential of the upper capacitance/driving electrode 2A is set to the ground potential.

As illustrated in FIG. 14B, when the upper capacitance/driving electrode 2A is moved downward (toward the lower driving electrode 31), a bias potential is supplied to the lower driving electrode 31 so that the potential difference between the ground electrode 12B and the lower driving electrode 31 is equal to or larger than the pull-in voltage.

This potential difference causes electrostatic attraction to occur between the upper capacitance/driving electrode 2A and the lower driving electrode 31. Owing to this electrostatic attraction, the upper capacitance/driving electrode 2A bends downward. The interval between the upper capacitance/driving electrode 2A and the signal electrode 118 therefore decreases. The value of the capacitance $C_3$ also varies. This causes the potential of the signal electrode 11B to vary. The potential difference between the signal electrode 11B and the ground electrode 12B is output as an RF voltage (RF power) to the outside.

When the upper capacitance/driving electrode 2A is restored to the original state (up-state), a pull-out voltage (herein, ground potential) is applied between the ground electrodes 12B and the lower driving electrode 31.

In cases where there is no problem if a creep phenomenon occurs in the movable upper electrode 2A, or in cases where the MEMS variable capacitance device is used for applications with the small frequency of a driving, the structure of the MEMS variable capacitance device 100D illustrated in FIGS. 13 to 14B can be employed.

Since the MEMS variable capacitance device 100D of this embodiment does not have a spring structure in a complicated shape, difficult processing is not necessary, and the manufacturing processes can be reduced. Thus, in this embodiment, manufacturing cost of the MEMS variable capacitance device can be reduced.

In the MEMS variable capacitance device 100D of this embodiment, the capacitances $C_1$ and $C_3$ are connected in series between the upper capacitance/driving electrode 2 and the lower capacitance electrode 11B through the lower driving electrode 31. These capacitances $C_1$ and $C_3$ are such that the constant capacitance $C_1$ and the variable capacitance $C_3$ are connected in series between the signal electrode 11B and the ground electrode 12B. Consequently, the hot switching properties of the MEMS variable capacitance device 100D improve.

As described above, according to the fourth embodiment, the MEMS device with the improved hot switching properties can be achieved. Further, according to this embodiment, contributions to simplification of a method of manufacturing a MEMS variable capacitance device and reduction in manufacturing cost can be made.

(5) Application

Figure 15:
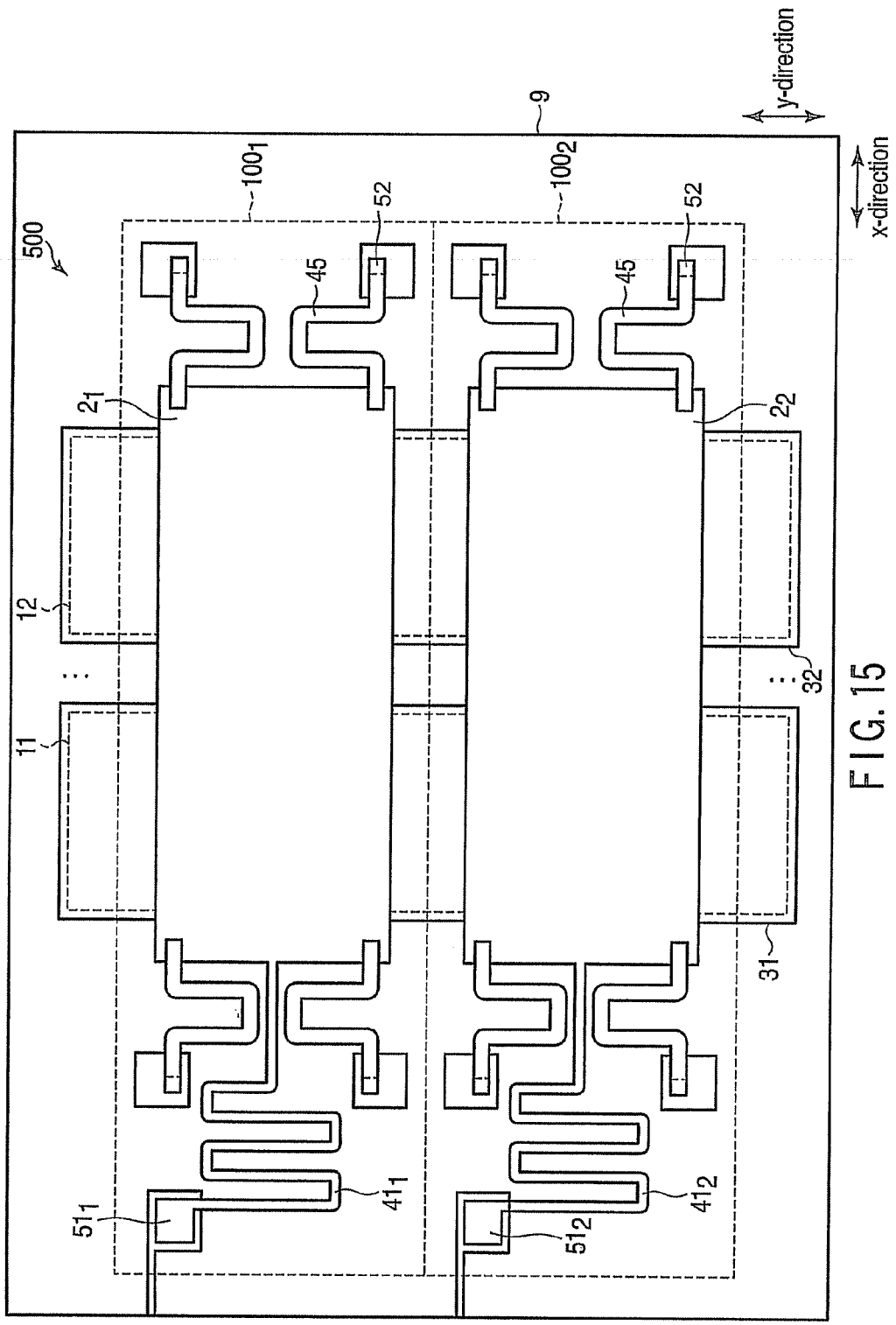
FIG. 15 illustrates an application of an embodiment.

Referring to FIG. 15, an application of a MEMS device according to an embodiment is described. FIG. 15 is a plan view illustrating a planar structure of a MEMS device in this application.

As illustrated in FIG. 15, a capacitance bank may be formed using a plurality of MEMS variable capacitance devices $100_1$ and $100_2$.

As illustrated in FIG. 15, a capacitance bank 500 is formed of the plurality of MEMS variable capacitance devices $100_1$ and $100_2$. In the capacitance bank 500 illustrated in FIG. 15, a plurality of MEMS variable capacitance devices which have been described in the first embodiment are used. While two MEMS variable capacitance devices $100_1$ and $100_2$ are illustrated here for the purpose of simplification, it should be understood that the capacitance bank 500 may be formed using three or more MEMS variable capacitance devices. It should also be understood that the capacitance bank 500 may be formed using the MEMS variable capacitance devices described in the second to fourth embodiments.

The plurality of MEMS variable capacitance devices $100_1$ and $100_2$ is provided on the single substrate 9. The plurality of MEMS variable capacitance devices $100_1$ and $100_2$ is arranged along the y-direction.

The signal/ground electrodes 11 and 12 and the lower driving electrodes 31 and 32 extend in the y-direction, and their electrodes 11, 12, 31 and 32 are commonly used by the plurality of MEMS variable capacitance devices $100_1$ and $100_2$ arranged in the y-direction. As described in the first embodiment referring to FIG. 2A, the lower driving electrodes 31 and 32 are stacked above the signal/ground electrodes 11 and 12 with an insulating film interposed therebetween.

Upper capacitance/driving electrodes $2_1$ and $2_2$ are provided in the MEMS variable capacitance devices $100_1$ and $100_2$, respectively. The upper capacitance/driving electrodes $2_1$ and $2_2$ of the MEMS variable capacitance devices are connected through first spring structures $41_1$ and $41_2$ to anchor portions $51_1$ and $51_2$, respectively. The upper capacitance/driving electrodes $2_1$ and $2_2$ are supported in midair by the anchor portions $51_1$ and $51_2$, respectively.

A low pass filter is connected to each of the two lower driving electrodes 31 and 32 in the same manner as illustrated in FIG. 4, which is not illustrated in FIG. 15. Potentials are supplied through the low pass filters to the lower driving electrodes 31 and 32 from the potential supply circuits.

A low pass filter is connected to each of the upper capacitance/driving electrodes $2_1$ and $2_2$. Likewise, potential supply circuits are also connected one by one to the upper capacitance/driving electrodes $2_1$ and $2_2$ through the low pass filters. In this way, potentials are individually supplied to the upper capacitance/driving electrodes $2_1$ and $2_2$ of the MEMS variable capacitance devices $100_1$ and $100_2$.

Thereby, the MEMS variable capacitance devices $100_1$ and $100_2$ are controlled so that they are in two states, the up-state and the down-state, independently of each other.

As described in the first to fourth embodiments, one MEMS variable capacitance device $100_1$ outputs an RF voltage (RF power) within the range of the two states, the up-state and the down-state. Therefore, the frequency of the RF voltage output by one MEMS variable capacitance device $100_1$ is limited to a value resulting from the movable range of the up-state/down-state and the cycle of operation.

As in this application, in cases where the capacitance bank 500 is formed using the plurality of MEMS variable capacitance devices $100_1$ and $100_2$, controlling the up-state/down-state of each of the MEMS variable capacitance devices $100_1$ and $100_2$ enables the capacitance bank 500 to output an RF voltage with a higher frequency than that of an RF voltage which one MEMS variable capacitance device outputs. That is, by adjusting the timing at which each of the MEMS variable capacitance devices $100_1$ and $100_2$ enters the up-state or the down-state, the capacitance bank 500 can obtain an RF voltage with a higher frequency. The RF voltage can be increased by simultaneously causing the plurality of MEMS variable capacitance devices $100_1$ and $100_2$ to be in the down-state.

Accordingly, forming the capacitance bank 500 using a plurality of MEMS variable capacitance devices $100_1$ and $100_2$ allows output (RF voltage/RF power) in a wider frequency band to be obtained.

Moreover, as described above, the MEMS variable capacitance devices described in the first to fourth embodiments have high switching properties.

It should therefore be understood that the capacitance bank 500 using this MEMS variable capacitance device has the improved hot switching properties.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MEMS device comprising:
   first and second lower electrodes on a substrate;
   a first driving electrode which is provided above the first lower electrode with a first insulating film interposed therebetween and which forms a fixed capacitance element having a first capacitance between the first lower electrode and the first driving electrode;
   a second driving electrode which is provided above the second lower electrode with a second insulating film interposed therebetween and which forms a fixed capacitance element having a second capacitance between the second lower electrode and the second driving electrode; and
   an upper electrode which is supported by first and second anchors in midair above the first and second driving electrodes and which moves toward the first and second driving electrodes and which has a variable third capacitance between the first driving electrode and the upper electrode and has a variable fourth capacitance between the second driving electrode and the upper electrode,
   a first spring structure including a first material, one end of the first spring structure connected to the upper electrode and the other end of the first spring structure connected to the first anchor;
   a second spring structure including a second material different from the first material, one end of the second spring structure connected to the upper electrode and the other end of the second spring structure connected to the second anchor.

2. The MEMS device of claim 1, wherein
   when the first to fourth capacitances are denoted by $C_1$, $C_2$, $C_3$ and $C_4$, respectively, at least one of a capacitance ratio $C_3/C_1$ of the first capacitance and the third capacitance and a capacitance ratio $C_4/C_2$ of the second capacitance and the fourth capacitance is 0.5 or more.

3. The MEMS device of claim 1, further comprising:
   low pass filters connecting to the upper electrode and the first and second driving electrodes, respectively,
   wherein potentials are supplied through the low pass filters to the upper electrode and each of the driving electrodes.

4. The MEMS device of claim 1, wherein
   a capacitance value between the first and second lower electrodes is determined by a value of a composite capacitance of the first, second, third and fourth capacitances connected in series, and
   the value of the composite capacitance connected in series is used as a variable capacitance value.

5. The MEMS device of claim 1, wherein
   the first driving electrode is covered with a third insulating film, and
   the second driving electrode is covered with a fourth insulating film.

6. The MEMS device of claim 1, wherein
a spring constant of the second spring structure is larger than a spring constant of the first spring structure.
7. The MEMS device of claim 1, wherein
the first material is a ductile material and the second material is brittle material.
8. A MEMS device comprising:
first and second lower electrodes on a substrate;
a first driving electrode adjacent to the first lower electrode with a first insulating film interposed therebetween in a parallel direction to a surface of the substrate;
a second driving electrode adjacent to the second lower electrode with a second insulating film interposed therebetween in the parallel direction to the surface of the substrate; and
an upper electrode which is supported in midair above the first and second driving electrodes and moves toward the first and second driving electrodes, and the upper electrode not vertically overlapping the first and second lower electrodes in a perpendicular direction to the surface of the substrate,
wherein a first capacitance is formed between the first lower electrode and the first driving electrode,
a second capacitance is formed between the second lower electrode and the second driving electrode,
a variable third capacitance is formed between the first driving electrode and the upper electrode, and
a variable fourth capacitance is formed between the second driving electrode and the upper electrode.
9. The MEMS device of claim 8, wherein
a capacitance value between the first and second lower electrodes is determined by a value of a composite capacitance of the first, second, third and fourth capacitances connected in series, and
the value of the composite capacitance connected in series is used as a variable capacitance value.
10. The MEMS device of claim 8, wherein
when the first to fourth capacitances are denoted by $C_1$, $C_2$, $C_3$ and $C_4$, respectively, at least one of a capacitance ratio $C_3/C_1$ of the first capacitance and the third capacitance and a capacitance ratio $C_4/C_2$ of the second capacitance and the fourth capacitance is 0.5 or more.
11. The MEMS device of claim 8, wherein
a potential of the first lower electrode is set to a constant potential, and a potential of the second lower electrode is variable.
12. The MEMS device of claim 8, wherein
the first and second driving electrodes are adjacent to each other in the parallel direction to the surface of the substrate, and
the first and second driving electrodes are disposed between the first and second lower electrodes.
13. The MEMS device of claim 8, further comprising:
a first conductive layer which extends from the first insulating film on the first lower electrode toward the first driving electrode and which is in contact with the first driving electrode; and
a second conductive layer which extends from the second insulating film on the second lower electrode toward the second driving electrode and which is in contact with the second driving electrode.
14. The MEMS device of claim 8, wherein
the upper electrode is electrically in a floating state.
15. The MEMS device of claim 8, wherein
the first lower electrode is covered with the first insulating film,
the second lower electrode is covered with the second insulating film,
the first driving electrode is covered with a third insulating film, and
the second driving electrode is covered with a fourth insulating film.
16. A MEMS device comprising:
first and second lower electrodes on a substrate;
a first driving electrode adjacent to the first lower electrode with a first insulating film interposed therebetween;
a second driving electrode adjacent to the second lower electrode with a second insulating film interposed therebetween; and
an upper electrode which is supported by first and second anchors in midair above the first and second driving electrodes and moves toward the first and second driving electrodes,
a first spring structure including a first material, one end of the first spring structure connected to the upper electrode and the other end of the first spring structure connected to the first anchor;
a second spring structure including a second material different from the first material, one end of the second spring structure connected to the upper electrode and the other end of the second spring structure connected to the second anchor;
wherein a first capacitance is formed between the first lower electrode and the first driving electrode,
a second capacitance is formed between the second lower electrode and the second driving electrode,
a variable third capacitance is formed between the first driving electrode and the upper electrode, and
a variable fourth capacitance is formed between the second driving electrode and the upper electrode.
17. The MEMS device of claim 16, wherein
the first driving electrode is covered with the first insulating film,
the second driving electrode is covered with the second insulating film,
the first lower electrode is covered with a third insulating film, and
the second lower electrode is covered with a fourth insulating film.
18. The MEMS device of claim 16, wherein
a spring constant of the second spring structure is larger than a spring constant of the first spring structure.
19. The MEMS device of claim 16, wherein
the first material is a ductile material and the second material is brittle material.
20. The MEMS device of claim 1, wherein
a capacitance value between the first and second lower electrodes is determined by a value of a composite capacitance of the first, second, third and fourth capacitances connected in series, and
the value of the composite capacitance connected in series is used as a variable capacitance value.

* * * * *